United States Patent
Yamasaki

(10) Patent No.: US 7,636,134 B2
(45) Date of Patent: Dec. 22, 2009

(54) ELECTRO-OPTICAL DEVICE, METHOD OF MANUFACTURING THE SAME, AND ELECTRONIC APPARATUS

(75) Inventor: Yasuji Yamasaki, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 702 days.

(21) Appl. No.: 11/363,992

(22) Filed: Mar. 1, 2006

(65) Prior Publication Data

US 2006/0215069 A1    Sep. 28, 2006

(30) Foreign Application Priority Data

Mar. 25, 2005    (JP)    ............... 2005-087911

(51) Int. Cl.
*G02F 1/1343*    (2006.01)
(52) U.S. Cl. .......................... 349/38; 349/43
(58) Field of Classification Search ........................ None
See application file for complete search history.

(56) References Cited

U.S. PATENT DOCUMENTS

| | | | |
|---|---|---|---|
| 6,490,014 B1 * | 12/2002 | Ohtani et al. | 349/38 |
| 6,636,284 B2 | 10/2003 | Sato | |
| 7,242,440 B2 | 7/2007 | Kurashina et al. | |
| 2003/0168688 A1 | 9/2003 | Ohtani et al. | |

FOREIGN PATENT DOCUMENTS

| | | |
|---|---|---|
| JP | A 6-3703 | 1/1994 |
| JP | A 7-49508 | 2/1995 |
| JP | A-2002-149089 | 5/2002 |
| JP | A 2002-156652 | 5/2002 |
| JP | A-2004-170914 | 6/2004 |
| KR | 1998-80760 A | 11/1998 |

* cited by examiner

*Primary Examiner*—Richard H Kim
(74) *Attorney, Agent, or Firm*—Oliff & Berridge, PLC

(57) ABSTRACT

An electro-optical device includes: a substrate; data lines and scanning lines extending to cross each other on the substrate; thin film transistors that are disposed to correspond to intersections of the data lines and the scanning lines in plan view above the substrate and are disposed below the data lines; storage capacitors that are disposed above the data lines, each of the storage capacitors being formed by stacking a pixel-potential-side electrode, a dielectric film, and a fixed-potential-side electrode in this order from below; pixel electrodes that are disposed for respective pixels defined in correspondence with the data lines and the scanning lines in plan view above the substrate, each of the pixel electrodes being electrically connected to the pixel-potential-side electrode and each of the thin film transistors; and an interlayer insulating film stacked above the dielectric film. Each of the storage capacitors has a stacked structure in which the fixed-potential-side electrode is stacked on the dielectric film exposed through an opening passing through the interlayer insulating film.

7 Claims, 18 Drawing Sheets

FIG. 8

UNIT: Å (ANGSTROM)

| LAYER NAME | FILM THICKNESS RANGE 1 | FILM THICKNESS RANGE 2 |
|---|---|---|
| FIRST LAYER (SCANNING LINE 11a) | 1000–3000 | 1500–2500 |
| BASE INSULATING FILM 12 | 2000–10000 | 3000–8000 |
| SECOND LAYER (SEMICONDUCTOR LAYER 1a) | 300–600 | 400–500 |
| SECOND LAYER (GATE ELECTRODE 3a) | 300–1500 | 500–1200 |
| FIRST INTERLAYER INSULATING FILM 41 | 2000–10000 | 3000–8000 |
| THIRD LAYER (DATA LINE 6a, ETC.) | 2000–8000 | 3000–7000 |
| THIRD LAYER (DIELECTRIC FILM 75) | 50–1000 | 100–500 |
| SECOND INTERLAYER INSULATING FILM 42 | 2000–10000 | 3000–8000 |
| FOURTH LAYER (FIXED-POTENTIAL-SIDE ELECTRODE 71, ETC.) | 2000–8000 | 3000–7000 |
| THIRD INTERLAYER INSULATING FILM 43 | 2000–10000 | 3000–8000 |
| FIFTH LAYER (PIXEL ELECTRODE 9a) | 200–2000 | 500–1600 |

ELECTRO-OPTICAL DEVICE, METHOD OF MANUFACTURING THE SAME, AND ELECTRONIC APPARATUS

This application claims priority from Japanese Patent Application Serial No. 2005-087911, filed in Japan on Mar. 25, 2005, the entire disclosure of which is hereby incorporated by reference.

BACKGROUND

1. Technical Field

The present invention relates to an electro-optical device, such as a liquid crystal device, to a method of manufacturing the same, and to an electronic apparatus, such as a liquid crystal projector.

2. Related Art

The electro-optical device includes pixel electrodes, scanning lines, data lines, and TFTs (thin film transistors) serving as pixel switching elements, which selectively drive the corresponding pixel electrodes, on a substrate and is configured to be driven in an active matrix driving method. In addition, storage capacitors may be provided between the TFTs and the pixel electrodes for the purpose of high contrast and so on. The above-mentioned elements are integrated on the substrate in a high density so as to improve the pixel aperture ratio or to make the device small (for example, see JP-A-2002-156652).

As such, the electro-optical device is required to perform higher quality and higher definition display and to be made even smaller, and accordingly, a variety of measures other than those described above have been proposed. For example, when light is incident on a semiconductor layer of a TFT, a light leakage current is generated, which deteriorates the display quality. In order to prevent this, a light shielding layer is provided in the vicinity of the semiconductor layer. Further, even though the capacitance of a storage capacitor is preferably as large as possible, it is desirable to design the storage capacitor so that the pixel aperture ratio is not sacrificed. Furthermore, it is preferable that those various circuit elements be integrated on a substrate in a high density so as to make the device small.

On the other hand, there has been proposed various techniques for improving the device performance or the manufacturing yield by paying attention to the shape of an electronic element, such as a storage capacitor, and a method of manufacturing the same in the electro-optical device (for example, see JP-A-6-3703 and JP-A-7-49508).

However, according to the above-mentioned various techniques of the related art, as the function or performance of the electro-optical device is improved, a stacked structure on a substrate becomes basically complicated. This also causes the manufacturing method to be complicated and the manufacturing yield to be lowered. In contrast, in order to simplify the stacked structure or a manufacturing process, there is a technical problem in that the display quality may be deteriorated because the light-shielding performance is lowered or an image signal is deteriorated due to pixel electrodes and parasitic capacitors located below the pixel electrodes.

SUMMARY

An advantage of some aspects of the invention is that it provides an electro-optical device, which is suitable for simplifying a stacked structure or a manufacturing process and can perform high-quality display, a method of manufacturing the electro-optical device, and an electronic apparatus having the electro-optical device.

According to a first aspect of the invention, an electro-optical device includes: a substrate; data lines and scanning lines extending to cross each other on the substrate; thin film transistors that are disposed to correspond to intersections of the data lines and the scanning lines in plan view above the substrate and are disposed below the data lines; storage capacitors that are disposed above the data lines, each of the storage capacitors being formed by stacking a pixel-potential-side electrode, a dielectric film, and a fixed-potential-side electrode in this order from below; pixel electrodes that are disposed for respective pixels defined in correspondence with the data lines and the scanning lines in plan view above the substrate, each of the pixel electrodes being electrically connected to the pixel-potential-side electrode and each of the thin film transistors; and an interlayer insulating film stacked above the dielectric film. Each of the storage capacitors has a stacked structure in which the fixed-potential-side electrode is stacked on the dielectric film exposed through an opening passing through the interlayer insulating film.

In the electro-optical device according to the first aspect of the invention, the thin film transistors apply data signals, which are supplied from the data lines, to the pixel electrodes located at the pixels selected by the scanning lines while the electro-optical device is operated, and thus it is possible to drive the electro-optical device in the active matrix driving method. At this time, the storage capacitors enable the electric potential holding characteristic in the pixel electrodes to be improved and enable a high-contrast display.

In particular, in the electro-optical device according to the first aspect of the invention, each of the storage capacitors is configured such that the pixel-potential-side electrode, the dielectric film, and the fixed-potential-side electrode are stacked in this order from below and the fixed-potential-side electrode is configured to be stacked on the dielectric film exposed through the opening passing through the interlayer insulating film. For this reason, by forming an opening in a predetermined region within a non-opening region of a pixel, it is possible to form the storage capacitor in the predetermined region. Here, the 'non-opening region' refers to a region excluding the opening region, and the 'opening region' refers to a region where an actual electro-optical operation due to an electro-optical element or an electro-optical material is performed within an effective region, such as a region where light contributing to display for each pixel is emitted, of an image display region.

As such, it is possible to simplify a stacked structure on a substrate and to perform high-quality display. In addition, the simplification of the stacked structure on the substrate causes the manufacturing process to be simplified and the manufacturing yield to be improved.

In addition, the thin film transistor according to the first aspect of the invention is typically a top gate type thin film transistor. However, the thin film transistor may be a bottom gate type thin film transistor.

Further, according to a second aspect of the invention, an electro-optical device includes: a substrate; data lines and scanning lines extending to cross each other on the substrate; thin film transistors that are disposed to correspond to intersections of the data lines and the scanning lines in plan view above the substrate and are disposed below the data lines; storage capacitors that are disposed above the data lines, each of the storage capacitors being formed by stacking a pixel-potential-side electrode, a dielectric film, and a fixed-potential-side electrode in this order from below; pixel electrodes that are disposed for respective pixels defined in correspondence with the data lines and the scanning lines in plan view above the substrate, each of the pixel electrodes being electrically connected to the pixel-potential-side electrode and each of the thin film transistors; and an interlayer insulating film stacked above the pixel-potential-side electrode. Each of the storage capacitors has a stacked structure in which the dielectric film and the fixed-potential-side electrode are stacked on the pixel-potential-side electrode exposed through an opening passing through the interlayer insulating film.

In the electro-optical device according to the second aspect of the invention, the thin film transistors apply data signals, which are supplied from the data lines, to the pixel electrodes located at the pixels selected by the scanning lines while the electro-optical device is operated, and thus it is possible to drive the electro-optical device in the active matrix driving method. At this time, the storage capacitors enable the electric potential holding characteristic in the pixel electrodes to be improved and enable the high-contrast display.

In particular, in the electro-optical device according to the second aspect of the invention, each of the storage capacitors is configured such that the pixel-potential-side electrode, the dielectric film, and the fixed-potential-side electrode are stacked in this order from below and the dielectric film and the fixed-potential-side electrode are configured to be stacked on the pixel-potential-side electrode exposed through the opening passing through the interlayer insulating film. For this reason, by forming an opening in a predetermined region within a non-opening region of a pixel, it is possible to form the storage capacitor in the predetermined region.

As such, it is possible to simplify the stacked structure on a substrate and to perform high-quality image display. In addition, the simplification of the stacked structure on the substrate causes the manufacturing process to be simplified and the manufacturing yield to be improved.

In addition, the thin film transistor according to the second aspect of the invention is typically a top gate type thin film transistor. However, the thin film transistor may be a bottom gate type thin film transistor.

In the electro-optical device of the invention, preferably, each of the thin film transistors is disposed such that a channel region thereof is at least partially covered by each of the data lines in plan view above the substrate, each of the storage capacitors is disposed in a region including a region facing the channel region in plan view above the substrate, each of the data lines includes a first conductive light shielding film, and at least one of the fixed-potential-side electrode and the pixel-potential-side electrode includes a second conductive light shielding film.

According to the configuration described above, the channel region of each of the thin film transistors is at least partially covered by each of the data lines disposed thereabove, and each of the data lines includes the first conductive light shielding film. Therefore, due to the data line which can be disposed to be adjacent to the channel region, the channel region of the thin film transistor can be shielded from the light incident from above. In addition, in each of the storage capacitors, which is disposed above the data line and in the region including the region facing the channel region, at least one of the fixed-potential-side electrode and the pixel-potential-side electrode includes the second conductive light shielding film. Accordingly, due to the storage capacitor which can be disposed above the data line through the interlayer insulating film interposed therebetween so as to be adjacent to the data line, the channel region of the thin film transistor can be more reliably shielded from the light incident from above. As a result, during the operation described above, it is possible to reduce an optical leakage current generated in the thin film transistor, to improve the contrast ratio, and to perform the high-quality image display.

In the electro-optical device including the first and second light shielding films, preferably, each of the scanning lines is disposed in a region including a region facing the channel region in plan view above the substrate, is disposed below each of the thin film transistors on the substrate, is connected to a gate of each of the thin film transistors through a contact hole, and includes a third conductive light shielding film.

In this case, each of the scanning lines disposed below each of the thin film transistors so as to include the region facing the channel region includes the third conductive light shielding film. For this reason, even with respect to returned light, such as light reflected from a rear surface of a substrate or light which is generated in another liquid crystal device and passes through a composite optical system in a double plate projector, it is possible to shield the channel region from below by using the scanning line. As a result, the channel region of the thin film transistor can be reliably shielded from both the light incident from above and the light returned from below.

In addition, each of the scanning lines is connected to the gate of each of the thin film transistors through the contact hole. Here, the 'contact hole' refers to a hole passing through an interlayer insulating film in the thickness direction thereof so as to electrically connect conductive layers formed above and below the interlayer insulating film to each other. For example, there is a case in which an upper conductive layer becomes located inside the hole so as to be in contact with a lower conductive layer (that is, in a case of being formed as a so-called contact hole) or a case in which one end of the hole is in contact with the upper conductive layer and the other end thereof is in contact with the lower conductive layer by burying a conductive material inside the hole (that is, in a case of being formed as a plug).

In the electro-optical device of the invention, preferably, the dielectric film is formed in non-opening regions located between opening regions of the respective pixels in plan view above the substrate.

According to the configuration described above, the dielectric film can be formed in the non-opening regions. In other words, the dielectric film can rarely or never be formed in the opening regions. Therefore, even if the dielectric film is an opaque film, the transmittance of light in the opening regions is not lowered. Thus, it is not necessary to consider the transmittance of the dielectric film of the capacitor, and accordingly, it is possible to use a hafnium oxide ($HfO_2$) film, an alumina ($Al_2O_3$) film, a silicon nitride ($Si_3N_4$) film, or the like having high permittivity as the dielectric film.

For this reason, the dielectric film can also serve as a film for preventing moisture or humidity, which increases water resistance and moisture resistance.

In the electro-optical device of the invention, preferably, a conductive film is formed on a surface of each of the data lines facing the channel region, the conductive film having lower reflectivity than a conductive film forming a main body of each of the data lines.

According to the configuration described above, it is possible to prevent returned light from being reflected from the surface of the data line facing the channel region, that is, a lower surface of the data line, the returned light including light reflected from a rear surface of a substrate or light which is generated in another liquid crystal device and passes through a composite optical system in a double plate projector. As a result, the effect of light with respect to the channel region can be reduced. The data line can be obtained by forming a metal having lower reflectivity than the aluminum film forming the main body of the data line, or a barrier metal on the surface of the data line facing the channel region, that is, the lower surface of the data line.

In the electro-optical device of the invention, preferably, the pixel-potential-side electrode is formed by using a conductive film located at the same layer as the data lines.

According to the configuration described above, the stacked structure and the manufacturing process do not become complicated. As a result, the manufacturing yield can be improved.

In the electro-optical device of the invention, preferably, a relay layer that is formed on the substrate by using a conductive film located at the same layer as the fixed-potential-side electrode and relay-connects the pixel-potential-side electrode and each of the pixel electrodes is further included.

According to the configuration described above, the pixel-potential-side electrode and each of the pixel electrodes are electrically connected, that is, relay-connected to each other through the relay layer. The pixel-potential-side electrode and the relay layer are connected to each other, for example, through a contact hole passing through an interlayer insulating film interposed therebetween, and the relay layer and each of the pixel electrodes are connected to each other, for example, through a contact hole passing through an interlayer insulating film interposed therebetween. As a result, it is possible to avoid difficulty in making a connection between the pixel-potential-side electrode and each of the pixel electrodes with one contact hole because the interlayer distance therebetween is long. In particular, since the fixed-potential-side electrode and the relay layer are formed by using a conductive film located at the same layer, the stacked structure and the manufacturing process do not become complicated. In addition, when the fixed-potential-side electrode includes the second conductive light shielding film, the relay layer also includes the second conductive light shielding film, there is little possibility that the relay layer will cause the light shielding performance to be deteriorated.

In the electro-optical device including the relay layer, preferably, the relay layer is electrically connected to a drain of each of the thin film transistors through an extending portion of the pixel-potential-side electrode.

In this case, the relay layer and the drain are electrically connected to each other through the extending portion of the pixel-potential-side electrode. That is, the relay layer and the extending portion are connected to each other, for example, through a contact hole passing through an interlayer insulating film interposed therebetween, and the extending portion and the drain are connected to each other, for example, through a contact hole passing through an interlayer insulating film interposed therebetween. As a result, it is possible to avoid difficulty in making a connection between each of the pixel electrodes and the drain with one contact hole because the interlayer distance therebetween is long. In addition, the stacked structure and the manufacturing process do not become complicated. Moreover, it is possible to easily make the connection by not providing the fixed-potential-side electrode at a place where the extending portion and the relay layer are connected to each other in plan view, that is, a place where, for example, a contact hole is formed.

According to a third aspect of the invention, an electronic apparatus includes the above-described electro-optical device (including various configurations thereof).

According to this configuration, since the electronic apparatus includes the above-described electro-optical device, various electronic apparatuses capable of performing high-quality image display, such as a projection type display device, a television, a mobile phone, an electronic organizer, a word processor, a viewfinder-type or monitor-direct-view-type video tape recorder, a workstation, a video phone, a POS terminal, a touch panel, and the like. In addition, for example, an electrophoretic device such as an electronic paper, an electron emission device (field emission display and conduction electron-emitter display), or a digital light processing (DLP) device using the electrophoretic device and the electron emission device may be implemented as the electronic apparatus according to the invention.

According to a fourth aspect of the invention, a method of manufacturing an electro-optical device including a substrate, data lines and scanning lines extending to cross each other on the substrate, thin film transistors disposed below the data lines, storage capacitors disposed above the data lines, and pixel electrodes disposed above the storage capacitors includes: forming the thin film transistors in regions corresponding to intersections of the data lines and the scanning lines on the substrate in plan view; forming the data lines above the thin film transistors; forming each of the storage capacitors above the data lines by sequentially stacking a pixel-potential-side electrode, a dielectric film, and a fixed-potential-side electrode; and forming the pixel electrodes for respective pixels defined in correspondence with the data lines and the scanning lines in plan view above the substrate such that each of the pixel electrodes is electrically connected to each of the thin film transistors and the pixel-potential-side electrode. Forming the storage capacitors includes forming an interlayer insulating film above the dielectric film, forming an opening passing through the interlayer insulating film, and stacking the fixed-potential-side electrode on the dielectric film exposed through the opening.

According to the method, it is possible to manufacture the electro-optical device according to the first aspect of the invention. In particular, since the stacked structure on the substrate is relatively simple, it is possible to simplify the manufacturing process and to improve the manufacturing yield.

According to a fifth aspect of the invention, a method of manufacturing an electro-optical device including a substrate, data lines and scanning lines extending to cross each other on the substrate, thin film transistors disposed below the data lines, storage capacitors disposed above the data lines, and pixel electrodes disposed above the storage capacitors includes: forming the thin film transistors in regions corresponding to intersections of the data lines and the scanning lines on the substrate in plan view; forming the data lines above the thin film transistors; forming each of the storage capacitors above the data lines by sequentially stacking a pixel-potential-side electrode, a dielectric film, and a fixed-potential-side electrode; and forming the pixel electrodes for respective pixels defined in correspondence with the data lines and the scanning lines in plan view above the substrate such that each of the pixel electrodes is electrically connected to each of the thin film transistors and the pixel-potential-side electrode. Forming each of the storage capacitors includes forming an interlayer insulating film above the pixel-potential-side electrode, forming an opening passing through the interlayer insulating film, and stacking the dielectric film and the fixed-potential-side electrode on the pixel-potential-side electrode exposed through the opening.

According to the method, it is possible to manufacture the electro-optical device according to the second aspect of the invention. In particular, since the stacked structure on the substrate is relatively simple, it is possible to simplify the manufacturing process and to improve the manufacturing yield.

In the method described above, preferably, forming each of the storage capacitors includes forming the pixel-potential-side electrode by using a conductive film located at the same layer as the data lines.

According to the configuration, the stacked structure on the substrate is simpler than that in a case where the pixel-potential-side electrodes and the data lines are formed as separate layers. Therefore, it is possible to simplify the manufacturing process and to improve the manufacturing yield.

Such effects and other advantages of the invention will be apparent from the following embodiments to be described below.

BRIEF DESCRIPTION OF THE DRAWINGS

The invention will be described with reference to the accompanying drawings, wherein like numbers reference like elements.

FIG. 8 is a table illustrating an example of the thickness ranges of each layer and interlayer insulating film.

DESCRIPTION OF EXEMPLARY EMBODIMENTS

Hereinafter, embodiments of the invention will be described with reference to the accompanying drawings. In the embodiments to be described below, a TFT-active-matrix-driving-type liquid crystal device having a built-in driving circuit, which is an example of an electro-optical device of the invention, will be exemplified.

First Embodiment

A liquid crystal device according to a first embodiment of the invention will be described with reference to FIGS. 1 to 13.

Overall Configuration of Electro-optical Device

First, referring to FIGS. 1 and 2, an overall configuration of the liquid crystal device according to the present embodiment will be described. Here, FIG. 1 is a plan view illustrating the configuration of the liquid crystal device according to the present embodiment, and FIG. 2 is a cross-sectional view taken along the line II-II of FIG. 1.

Figure 1:
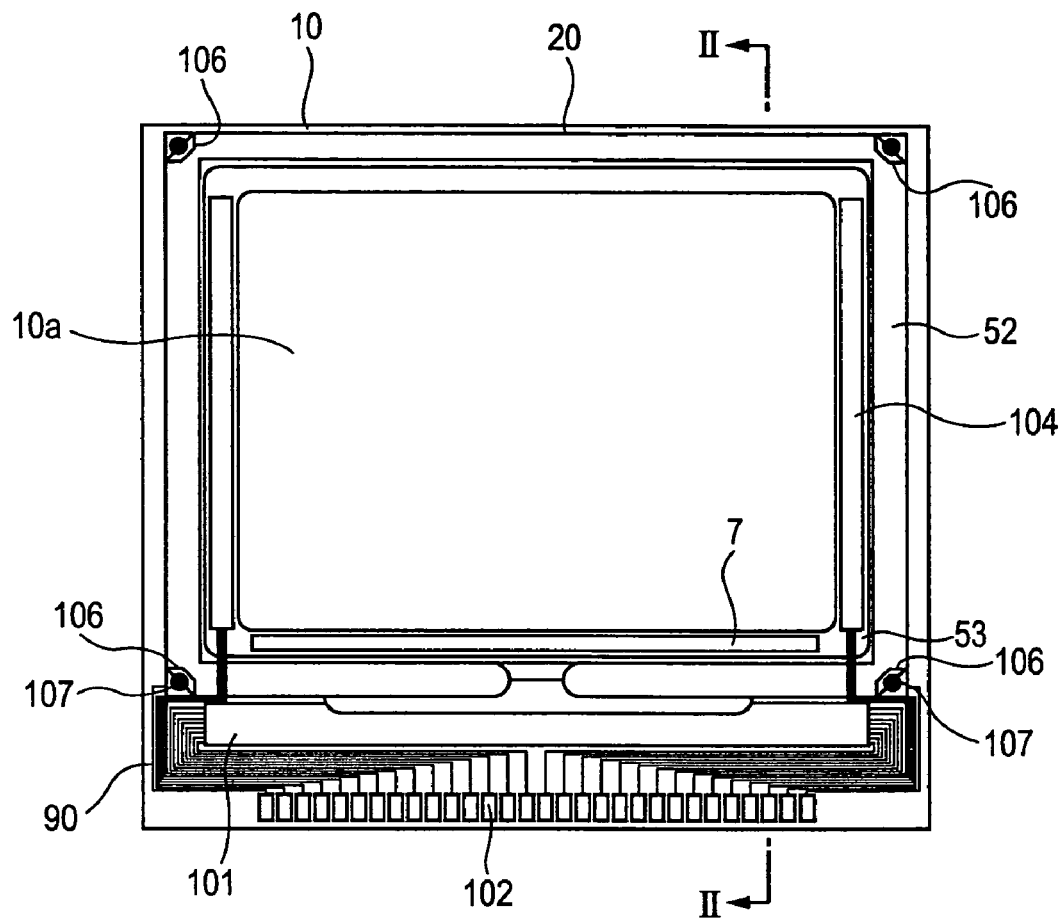
FIG. 1 is a plan view illustrating the overall configuration of a liquid crystal device according to a first embodiment of the invention.
Figure 2:
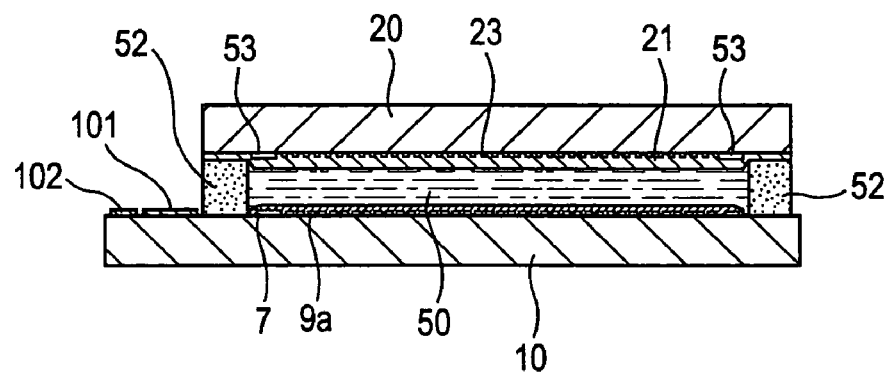
FIG. 2 is a cross-sectional view taken along the line II-II of FIG. 1.

In the liquid crystal device according to the present embodiment shown in FIGS. 1 and 2, a TFT array substrate 10 and a counter substrate 20 are disposed to face each other. A liquid crystal layer 50 is interposed between the TFT array substrate 10 and the counter substrate 20, and the TFT array substrate 10 and the counter substrate 20 are bonded to each other by a sealant 52 provided in a sealed region located around an image display region 10a.

In FIG. 1, a frame light-shielding film 53, which has a light-shielding property and defines a frame region of the image display region 10a, is provided at the counter substrate 20 side so as to be parallel to inner sides of the sealed region where the sealant 52 is disposed. In a peripheral region located outside the sealed region where the sealant 52 is disposed, a data line driving circuit 101 and an external circuit connection terminal 102 are provided along one side of the TFT array substrate 10. A sampling circuit 7 is provided inwardly from the sealed region located along the one side so as to be covered by the frame light-shielding film 53. Further, scanning line driving circuits 104 are provided inwardly from the sealed region located along two sides adjacent to the one side, so as to be covered by the frame light-shielding film 53. In addition, on the TFT array substrate 10, upper and lower conducting terminals 106, which connect the two substrates to each other with upper and lower conducting members 107, are provided at regions opposite to four corners of the counter substrate 20. Thereby, the electrical conduction between the TFT array substrate 10 and the counter substrate 20 can be made.

On the TFT array substrate 10, wiring lines 90 are formed to electrically connect the external circuit connection terminal 102, the data line driving circuit 101, the scanning line driving circuit 104, the upper and lower conducting terminals 106, and the like to one another.

In FIG. 2, on the TFT array substrate 10, a stacked structure is formed in which pixel switching TFTs serving as driving elements and the wiring lines, such as scanning lines and data lines, are formed. In the image display region 10a, pixel electrodes 9a are provided above the pixel switching TFTs and the wiring lines, such as the scanning lines and the data lines. On the other hand, a light shielding film 23 is provided on the counter substrate 20 facing the TFT array substrate 10. In addition, counter electrodes 21 made of a transparent material, such as an ITO, is formed on the light shielding film 23 so as to face a plurality of pixel electrodes 9a.

Further, in addition to the data line driving circuit 101 and the scanning line driving circuit 104, a test circuit or a test pattern to test the quality and defects of the liquid crystal device during the manufacturing process or at the time of shipping may be formed on the TFT array substrate 10.

Configuration of Image Display Region

Figure 3:
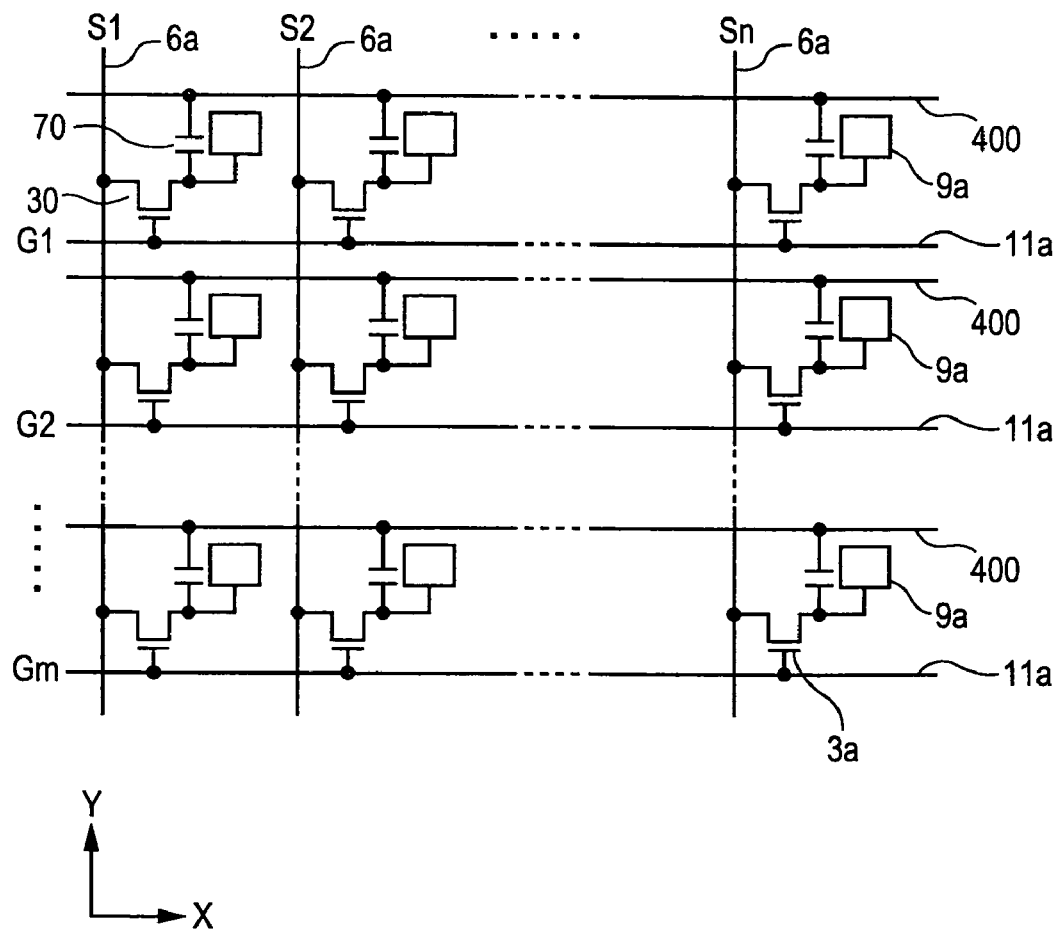
FIG. 3 is an equivalent circuit diagram illustrating various elements, wiring lines, and the like in a plurality of pixels.
Figure 4:
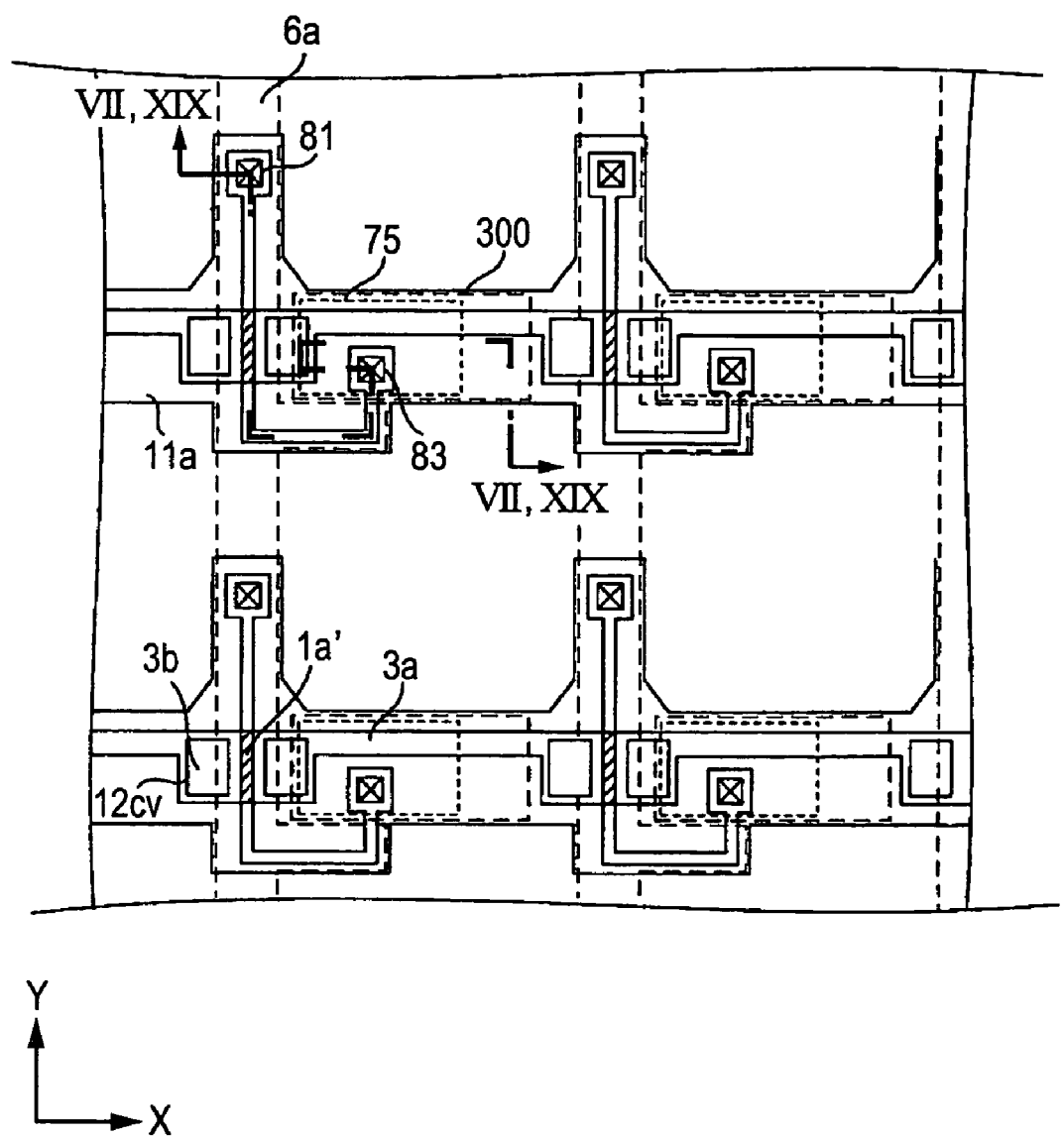
FIG. 4 is a plan view illustrating a pixel group on a TFT array substrate according to the first embodiment, in which only a configuration of lower layer parts (lower layer parts located up to reference numeral '75' (dielectric film) in FIG. 7) is shown.
Figure 5:
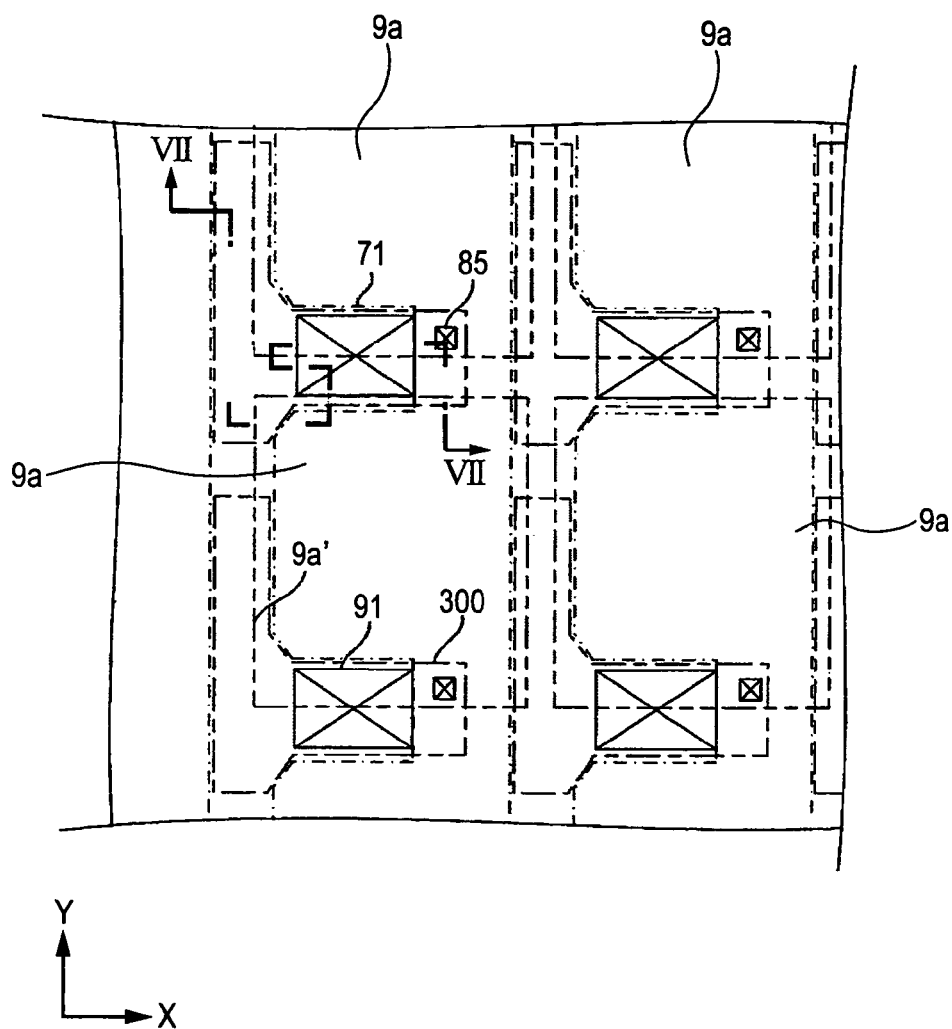
FIG. 5 is a plan view illustrating the pixel group on the TFT array substrate according to the first embodiment, in which only a configuration of upper layer parts (upper layer parts located above the reference numeral '75' (dielectric film) in FIG. 7) is shown.
Figure 6:
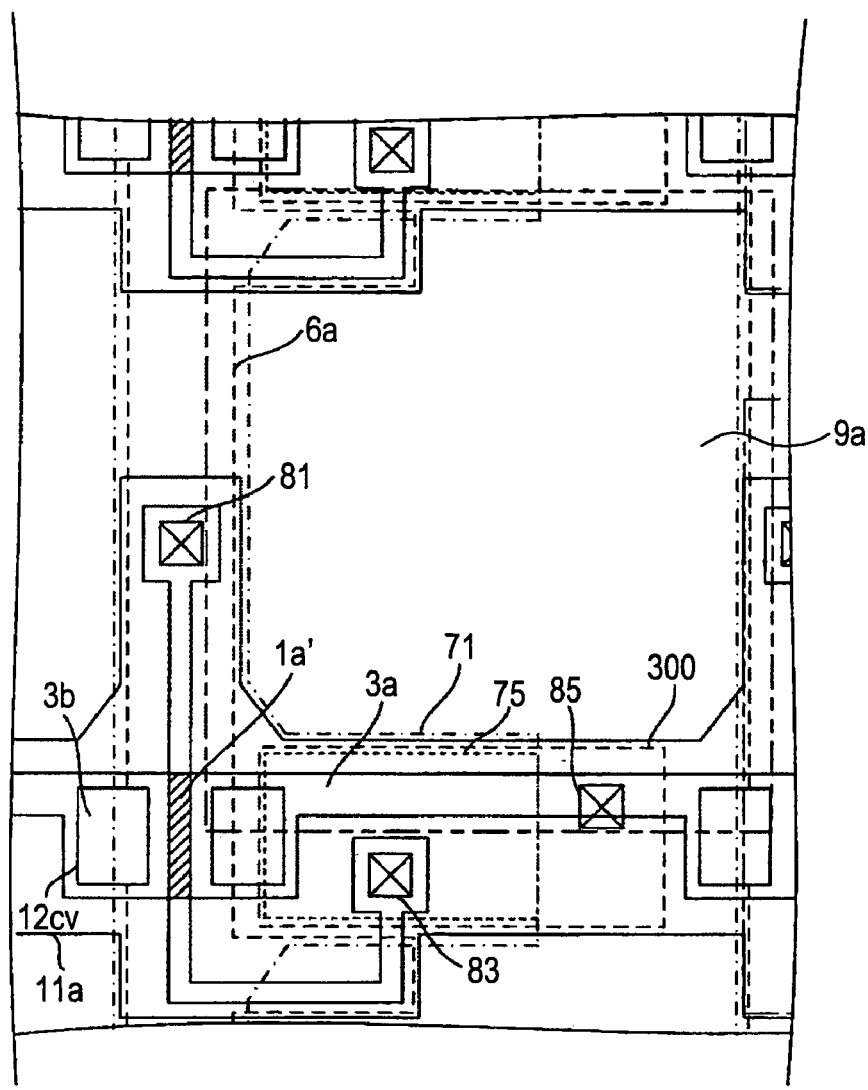
FIG. 6 is a plan view illustrating a case in which FIGS. 4 and 5 overlap each other, in which a portion is enlarged.
Figure 7:
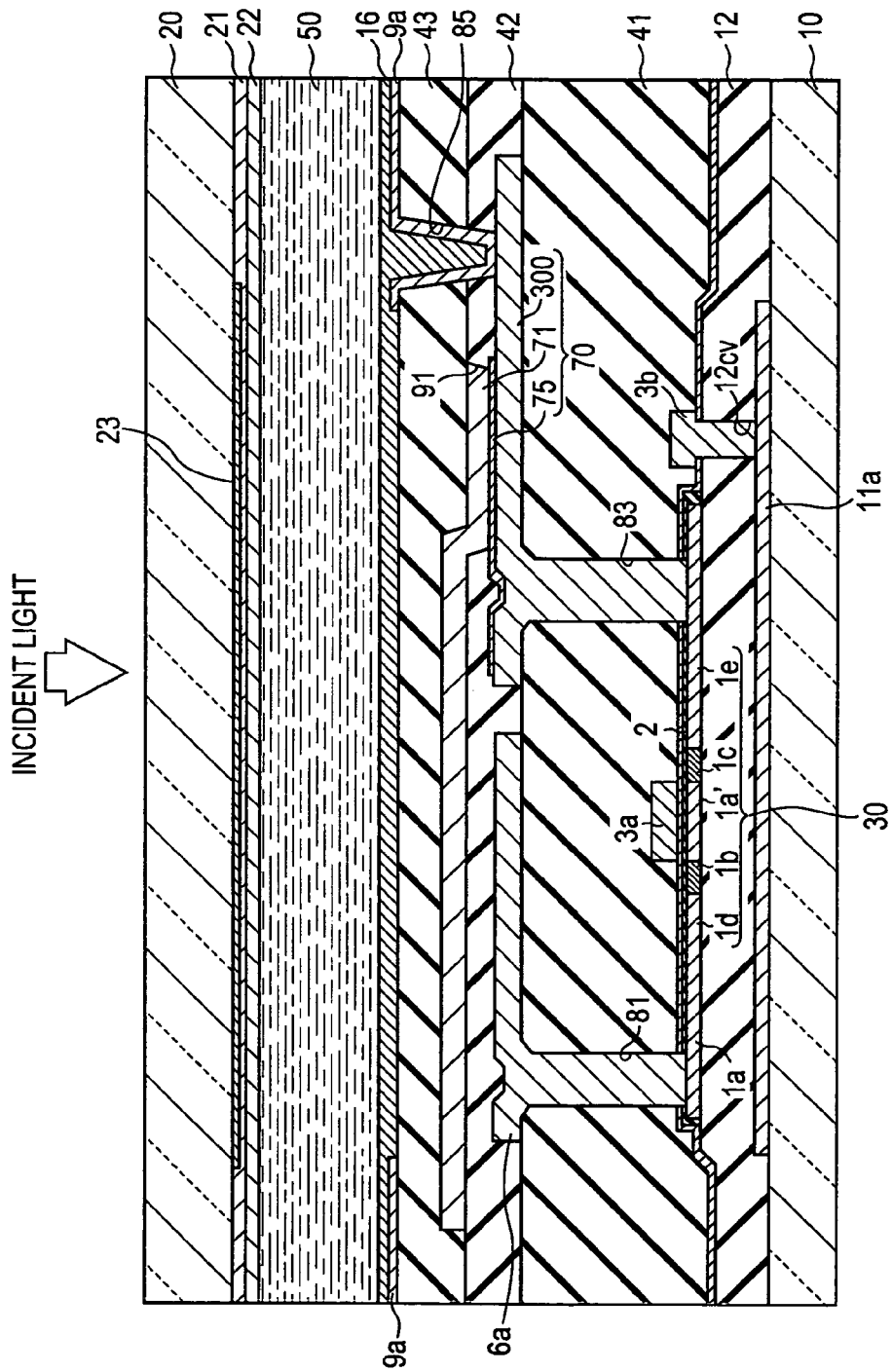
FIG. 7 is a cross-sectional view taken along the line VII-VII when FIGS. 4 and 5 overlap each other.

Next, a configuration of a pixel unit of the liquid crystal device according to the present embodiment will be described with reference to FIGS. 3 to 7. Here, FIG. 3 is an equivalent circuit diagram illustrating various elements, wiring lines, and so on, in a plurality of pixels which are formed in a matrix and form an image display region of the liquid crystal device. FIGS. 4 to 6 are plan views illustrating a partial configuration of the pixel unit on the TFT array substrate. FIGS. 4 and 5 correspond to lower and upper portions of a stacked structure to be described below, respectively. FIG. 6 is a plan view illustrating an enlarged stacked structure, where FIGS. 4 and 5 overlap each other. FIG. 7 is a cross-sectional view taken along the line VII-VII when FIGS. 4 and 5 overlap each other. In addition, in FIG. 7, the scale of each layer or member is adjusted in order to have a recognizable size in the drawings.

Principal Configuration of Pixel Unit

Referring to FIG. 3, each of a plurality of pixels, which forms the image display region of the liquid crystal device according to the present embodiment and is formed in a matrix, is provided with a pixel electrode 9a and a TFT 30 for controlling a switching operation of the pixel electrode 9a, and a corresponding data line 6a to which an image signal is supplied is electrically connected to a source of the TFT 30. Image signals S1, S2, . . . , and Sn may be supplied to the data lines 6a in a line-sequential manner in this order, or may be supplied to each group composed of the plurality of data lines 6a adjacent to each other.

Further, scanning lines 11a are electrically connected to gates of the TFTs 30, and scanning signals G1, G2, . . . , and Gm are applied to the scanning lines 11a in a pulsed manner and line-sequentially in this order at predetermined timings. The pixel electrodes 9a are electrically connected to drains of the TFTs 30, and image signals S1, S2, . . . , and Sn supplied from the data lines 6a are written into the pixel electrodes 9a at predetermined timings by switching on the TFTs 30 serving as switching elements for a predetermined period of time.

The image signals S1, S2, . . . , and Sn having predetermined levels, written into liquid crystal, which is an example of an electro-optical material, through the pixel electrodes 9a, are held between the pixel electrodes 9a and counter electrodes formed on the counter substrate for a predetermined period of time. In the liquid crystal, the alignment or order of a molecule group varies according to the voltage level being applied, and thus it is possible to modulate light and to perform gray-scale display. In a normally white mode, the transmittance with respect to the incident light decreases according to the voltage applied in a unit of each pixel, while in a normally black mode, the transmittance with respect to the incident light increases according to the voltage applied in the unit of each pixel. Therefore, as a whole, light having a contrast according to an image signal is emitted from the liquid crystal device.

In order to prevent the held image signals from leaking, a storage capacitor 70 is provided parallel to a liquid crystal capacitor formed between the pixel electrode 9a and the counter electrode. One electrode of the storage capacitor 70 is connected to the drain of the TFT so as to be parallel to the pixel electrode 9a, and the other electrode thereof is connected to a capacitive wiring line 400, having a fixed electric potential, so as to have a constant electric potential.

Specific Configuration of Pixel Unit

Next, a specific configuration of a pixel unit realizing the above-described operations will be described with reference to FIGS. 4 to 7.

In FIGS. 4 to 7, the respective circuit elements of the pixel unit are patterned to be formed on the TFT array substrate 10 as stacked conductive films. The TFT array substrate 10 is composed of, for example, a glass substrate, a quartz substrate, an SOI substrate, or a semiconductor substrate, and the TFT array substrate 10 is disposed to face the counter substrate 20 composed of, for example, the glass substrate or the quartz substrate. Further, each of the circuit elements is composed of a first layer including the scanning line 11a, a second layer including the TFT 30, a third layer including the data line 6a, a fourth layer including a fixed-potential-side electrode 71, and a fifth layer including the pixel electrode 9a, in this order from below. Furthermore, a base insulating film 12 is provided between the first and second layers, a first interlayer insulating film 41 is provided between the second and third layers, a second interlayer insulating film 42 is provided between the third and fourth layers, and a third interlayer insulating film 43 is provided between the fourth and fifth layers. Thereby, the respective elements described above are prevented from being short-circuited. Here, the first to third layers are shown as lower layers in FIG. 4, and the fourth and fifth layers are shown as upper layers in FIG. 5.

Configuration of First Layer—Scanning Line, Etc.

The first layer includes the scanning lines 11a. Each of the scanning lines 11a is patterned to have a shape composed of a main line part extending in the X direction of FIG. 4 and a protruding part extending in the Y direction of FIG. 4 in which the data lines 6a extend. The scanning line 11a is an example of a 'third conductive light shielding film' according to the invention, and is made of, for example, conductive polysilicon. Alternatively, the scanning line 11a may be made of a metal simplex including at least one high-melting-point metal selected from a group of titanium (Ti), chromium (Cr), tungsten (W), tantalum (Ta), molybdenum (Mo), and the like, an alloy thereof, metal silicide, polysilicide, or a laminate thereof.

In particular, in the present embodiment, the scanning line 11a is disposed below the TFT 30 so as to cover a region facing a channel region 1a' and is composed of a conductive film. For this reason, even with respect to returned light, such as light reflected from a rear surface of the TFT array substrate 10 or light which is generated in another liquid crystal device and passes through a composite optical system, such as a prism, when a double plate projector is constructed by using a liquid crystal device as a light valve, it is possible to shield the channel region 1a' from below by using the scanning line 11a.

Configuration of Second Layer—TFT, etc.

The second layer includes the TFTs 30. Each of the TFTs 30 has an LDD (Lightly Doped Drain) structure, for example, and includes a gate electrode 3a, a semiconductor layer 1a, and an insulating film 2 including a gate insulating film for insulating the gate electrode 3a from the semiconductor layer 1a. The gate electrode 3a is made of, for example, conductive polysilicon. The semiconductor layer 1a is made of, for example, polysilicon, and includes the channel region 1a', a lightly-doped source region 1b, a lightly-doped drain region 1c, a heavily-doped source region id, and a heavily-doped drain region 1e. In addition, the TFT 30 preferably has the LDD structure; however, the TFT 30 may have an offset structure in which impurities are not injected into the lightly-doped source region 1b and the lightly-doped drain region 1c or have a self-aligning structure in which the heavily-doped source region 1d and the heavily-doped drain region 1e are formed by injecting heavily-doped impurities with the gate electrode 3a as a mask.

A part 3b of the gate electrode 3a of the TFT 30 is electrically connected to the scanning line 11a through a contact hole 12cv formed in the base insulating film 12. The base insulating film 12 is made of, for example, a silicon oxide film, electrically isolates the first layer from the second layer, and is formed on the entire surface of the TFT array substrate 10 so as to prevent element characteristics of the TFT 30 from changing due to roughness or contamination caused by the abrasion of a substrate surface.

Further, the TFT 30 according to the present embodiment is a top gate type TFT. However, the TFT 30 may be a bottom gate type TFT.

Configuration of Third Layer—Data Line, etc.

The third layer includes the data lines 6a, pixel-potential-side electrodes 300, and a dielectric film 75.

Each of the data lines 6a is an example of a 'first conductive light shielding film' according to the invention, and has a three-layered structure composed of an aluminum film, a titanium nitride film, and a silicon nitride film in this order from below. The data line 6a is formed to partially cover the channel region 1a' of the TFT 30. Accordingly, by using the data line 6a which can be disposed to be adjacent to the channel region 1a', the channel region 1a' of the TFT 30 can be shielded from light incident from above. In addition, the data line 6a is electrically connected to the heavily-doped source region 1d of the TFT 30 through a contact hole 81 passing through the first interlayer insulating film 41.

In a modified example of the present embodiment, on a surface of the data line 6a facing the channel region 1a', another conductive film having lower reflectivity than a conductive film, such as an aluminum film forming a main body of the data line 6a, may be formed. According to the modified example, it is possible to prevent that the above-mentioned returned light is reflected from the surface of the data line 6a facing the channel region 1a', that is, a lower surface of the data line 6a, and thus multiplexed reflection light or stray light is generated. As a result, the effect of light with respect to the channel region 1a' can be reduced. The data line 6a can be obtained by providing a metal having lower reflectivity than the aluminum film forming the main body of the data line 6a, or a barrier metal on the surface of the data line 6a facing the channel region 1a', that is, a lower surface of the data line 6a. Further, the metal having lower reflectivity than the aluminum film or the barrier metal includes chromium (Cr), titanium (Ti), titanium nitride (TiN), tungsten (W), and so on.

The pixel-potential-side electrodes 300 are formed as the same film as the data lines 6a. The pixel-potential-side electrodes 300 and the data lines 6a are formed to be separated from each other, as shown in FIG. 4. Further, each of the pixel-potential-side electrodes 300 is electrically connected to the heavily-doped drain region 1e of the TFT 30 through a contact hole 83 passing through the first interlayer insulating film 41. The pixel-potential-side electrode 300 is disposed to face the fixed-potential-side electrode 71, which will be described later, through the dielectric film 75 interposed therebetween. The pixel-potential-side electrode 300, the dielectric film 75, and the fixed-potential-side electrode 71 form the storage capacitor 70.

The first interlayer insulating film 41 is made of, for example, NSG (non-silicate glass). Alternatively, the first interlayer insulating film 41 may be made of silicate glass, such as PSG (phosphorus silicate glass), BSG (boron silicate glass), or BPSG (boron phosphorus silicate glass), a silicon nitride, a silicon oxide, or the like. A surface of the first interlayer insulating film 41 is subjected to a CMP (chemical mechanical polishing) process or a polishing process, a spin coat process, and a planarizing process, such as a burying process with respect to recessed portions. Thereby, unevenness of the lower layers due to the parts described above is removed, so that the surface of the first interlayer insulating film 41 becomes planarized. As such, it is possible to reduce the possibility that the alignment state of the liquid crystal layer 50 interposed between the TFT array substrate 10 and the counter substrate 20 will be out of order, which makes it possible to perform even higher quality display. Further, the planarization process may be performed on surfaces of the other interlayer insulating films.

The dielectric film 75 is stacked on the pixel-potential-side electrode 300. As shown in FIG. 4, the dielectric film 75 is formed in non-opening regions, which are located between opening regions of pixels, in plan view above the TFT array substrate 10. That is, the dielectric film 75 is rarely formed in the opening regions. Thus, even if the dielectric film 75 is an opaque film, the transmittance of light in the opening regions is not lowered. Accordingly, the dielectric film 75 can be formed by using, for example, a silicon nitride film having high permittivity, without considering the transmittance. For this reason, the dielectric film 75 can also serve as a film for preventing moisture or humidity, which can increase water resistance and moisture resistance. Moreover, as a dielectric film, it is possible to use a single-layered film or a multi-layered film made of, for example, hafnium oxide ($HfO_2$), alumina ($Al_2O_3$), tantalum oxide ($Ta_2O_5$), zirconium oxide ($ZrO_2$), lanthanum oxide ($La_2O_3$), titanium oxide ($TiO_2$), praseodymium ($Pr_2O_3$), in addition to the silicon nitride film.

Configuration of Fourth Layer—Fixed-Potential-Side Electrode, Etc.

The second interlayer insulating film 42 is formed on the entire surface of the third layer, and the fixed-potential-side electrode 71 is formed thereon as the fourth layer. In addition, the second interlayer insulating film 42 is made of silicate glass, such as PSG, BSG, or BPSG, a silicon nitride, a silicon oxide, or the like. A surface of the second interlayer insulating film 42 is subjected to a planarization process such as the CMP process, in the same manner as the first interlayer insulating film 41.

As shown in FIGS. 5 and 7, in the present embodiment, the second interlayer insulating film 42 is formed with an opening 91 so that the dielectric film 75 therebelow is exposed. The fixed-potential-side electrode 71 is stacked on the dielectric film 75 exposed through the opening 91, thereby forming the storage capacitor 70. Here, the opening 91 can be formed in a predetermined region where the dielectric film 75 is exposed, within the non-opening region of a pixel, and the storage capacitor 70 can be formed in the predetermined region.

As shown in FIG. 7, the fixed-potential-side electrode 71 is provided to extend on the data line 6a through the second interlayer insulating film 42 interposed therebetween. Also, the fixed-potential-side electrode 71 is an example of a 'second conductive light shielding film' according to the invention, and the fixed-potential-side electrode 71 is made of a metal simplex including at least one high-melting-point metal selected from a group of Ti, Cr, W, Ta, Mo, and the like, an alloy thereof, metal silicide, polysilicide, or a laminate thereof. Preferably, the fixed-potential-side electrode 71 is made of tungsten silicide. Accordingly, by using the fixed-potential-side electrode 71 which can be disposed to be adjacent to the data line 6a through the interlayer insulating film 42 interposed therebetween, the channel region 1a' of the TFT 30 can be more reliably shielded from the light incident from the upper layer side.

Configuration of Fifth Layer—Pixel Electrode, Etc.

The third interlayer insulating film 43 is formed on the entire surface of the fourth layer, and the pixel electrodes 9a are formed thereon as the fifth layer. The third interlayer insulating film 43 is made of, for example, NSG. In addition, the third interlayer insulating film 43 may be made of silicate glass, such as PSG, BSG, BPSG, or the like, silicon nitride, silicon oxide, or the like. A surface of the third interlayer insulating film 43 is subjected to a planarization process such as the CMP process, in the same manner as the first and second interlayer insulating films 41 and 42.

The pixel electrodes 9a (an outline of each of the pixel electrodes 9a is shown by a dotted line 9a' in FIG. 5) are respectively disposed in the pixel regions which are arranged to be partitioned horizontally and vertically, and the data lines 6a and the scanning lines 11a are formed on boundaries therebetween so as to be arranged in a matrix (see FIGS. 4 and 5). Further, the pixel electrode 9a is composed of a transparent conductive film, such as ITO (indium tin oxide).

The pixel electrode 9a is electrically connected to an extending portion of the pixel-potential-side electrode 300 through a contact hole 85 passing through the third interlayer insulating film 43 and the second interlayer insulating film 42 (see FIG. 7). Further, as described above, the pixel-potential-side electrode 300 and the heavily-doped drain region 1e of the TFT 30 are electrically connected to each other through a contact hole 83. That is, the pixel electrode 9a and the heavily-doped drain region 1e of the TFT 30 are relay-connected to each other through the pixel-potential-side electrode 300. Thereby, it is possible to avoid difficulty in making a connection between a pixel electrode and a drain with one contact hole because the interlayer distance therebetween is long. In addition, the stacked structure and the manufacturing process do not become complicated.

On the pixel electrodes 9a, an alignment film 16 subjected to a predetermined alignment process, such as a rubbing process, is provided.

Thicknesses of Each Layer and Thickness of Interlayer Insulating Film

An example of the thickness ranges of each layer and interlayer insulating film is shown in FIG. 8. Here, FIG. 8 is a table illustrating the example of the thickness ranges of each layer and interlayer insulating film. In the present embodiment, by the combination of a film thickness range 1 or a film thickness range 2 shown in FIG. 8, the respective layers and the interlayer insulating films are stacked.

Until now, the configuration of the pixel unit at the TFT array substrate 10 side has been described.

On the other hand, for the counter substrate 20, the counter electrode 21 is provided on the entire surface thereof facing the TFT array substrate 10, and an alignment film 22 is formed thereon (below the counter electrode 21 in FIG. 7). The counter electrode 21 is made of, for example, a transparent conductive film, such as ITO, in the same manner as the pixel electrode 9a. Between the counter substrate 20 and the counter electrode 21, a light-shielding film 23 for covering at least a region facing the TFT 30 is provided to prevent optical leakage current from being generated in the TFT 30.

Between the TFT array substrate 10 and the counter substrate 20 constructed above, the liquid crystal layer 50 is provided. The liquid crystal layer 50 is formed by injecting liquid crystal into a space formed by sealing the peripheral portions of the substrates 10 and 20 with sealant. The liquid crystal layer 50 has a predetermined alignment state by the alignment films 16 and 22 subjected to an alignment process, such as a rubbing process, in a condition in which an electric field is not applied between the pixel electrode 9a and the counter electrode 21.

The construction of the pixel unit described above is commonly applied to the respective pixel units, as shown in FIGS. 4 and 5. In the above-mentioned image display region 10a (refer to FIG. 1), the pixel units are periodically formed. Meanwhile, in the liquid crystal device, driving circuits, such as the scanning line driving circuit 104 and the data line driving circuit 101, are formed in the peripheral regions located in the vicinity of the image display region 10a, as described above with reference to FIGS. 1 and 2.

Method of Manufacturing Electro-Optical Device According to First Embodiment

Next, a method of manufacturing the electro-optical device will be described with reference to FIGS. 9 to 13. FIGS. 9 to 13 are process views illustrating the stacked structure of the electro-optical device in each manufacturing process, in the stacking order of the cross section corresponding to FIG. 7. Here, it will be described about processes of forming a scanning line, a TFT, a data line, a storage capacitor, and a pixel electrode, which are main components of the liquid crystal device in the present embodiment.

Figure 9:
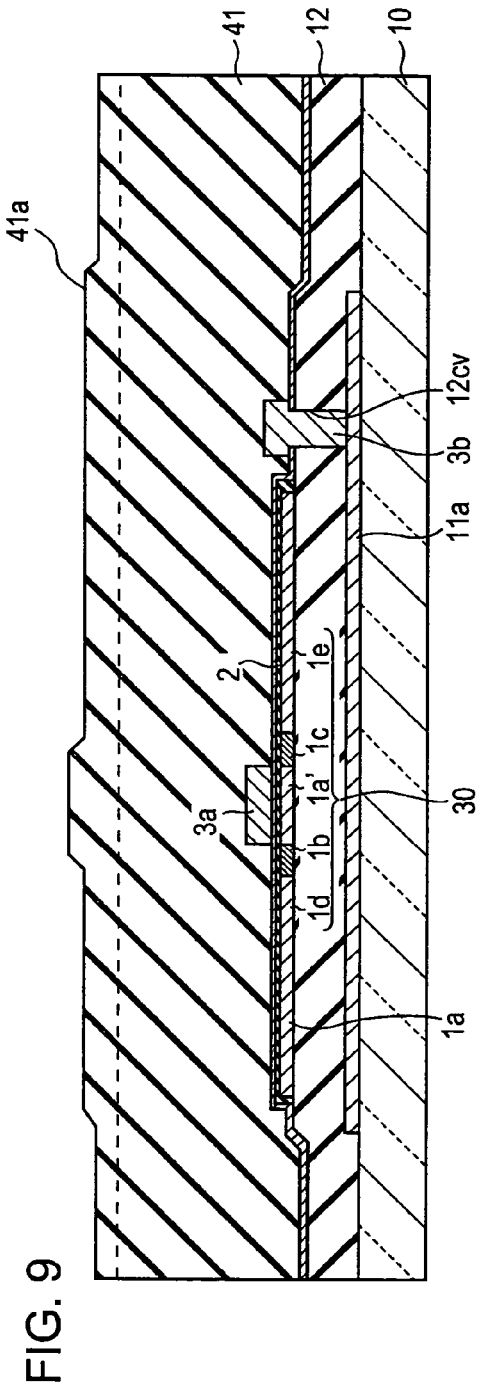
FIG. 9 is a cross-sectional view illustrating a method of manufacturing the liquid crystal device according to the first embodiment in the order (first process).

First, as shown in FIG. 9, the respective layers from the scanning line 11a to the first interlayer insulating film 41 are formed to be stacked on the TFT array substrate 10. At this time, the TFT 30 is formed in a region corresponding to an intersection of the scanning line 11a and the data line 6a to be formed later. In each process, a typical semiconductor integration technique can be utilized. Further, when the first interlayer insulating film 41 is formed, a precursory film 41a of the first interlayer insulating film 41 is first formed over the entire surface of the TFT array substrate 10. On a surface of the precursory film 41a, unevenness caused by the TFT 30 located therebelow is generated. For this reason, the precursory film 41a is formed to be thick, and then the precursory film 41a is cut out to a dotted line in the drawing by using a CMP process, for example, so as to planarize the surface of the precursory film 41a, thereby forming the first interlayer insulating film 41.

Figure 10:
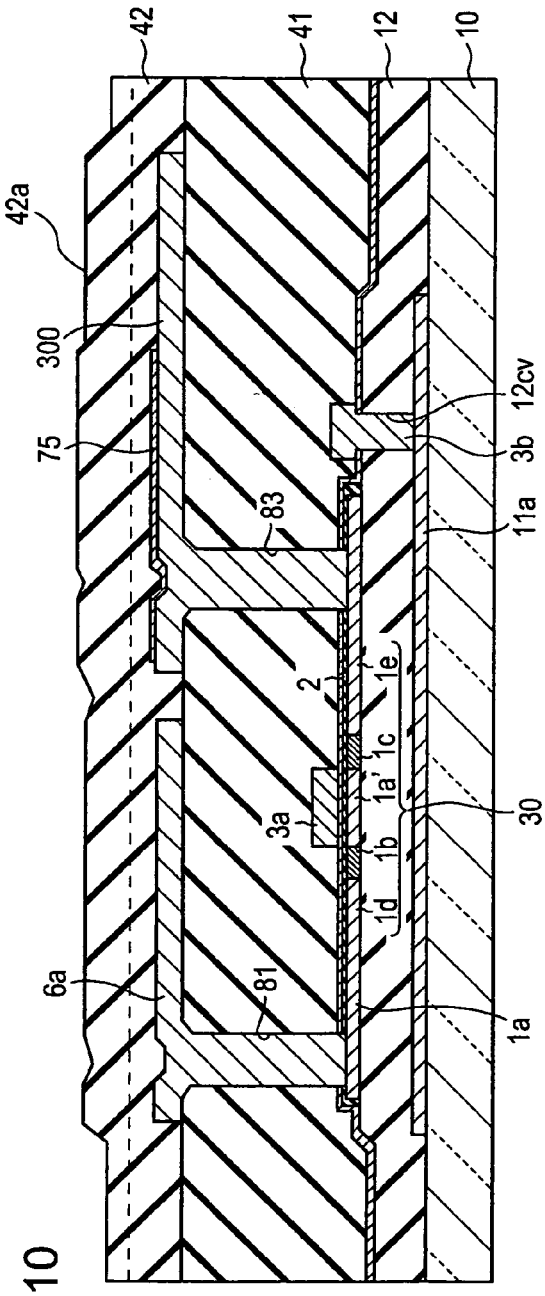
FIG. 10 is a cross-sectional view illustrating the method of manufacturing the liquid crystal device according to the first embodiment in the order (second process).

Thereafter, referring to the process shown in FIG. 10, predetermined portions of the first interlayer insulating film 41 are etched to form the contact hole 81 and the contact hole 83, the contact hole 81 having a depth reaching the heavily-doped source region 1d and the contact hole 83 reaching the heavily-doped drain region 1e. Then, a conductive light shielding film is stacked in a predetermined pattern and the data line 6a and the pixel-potential-side electrode 300 are formed. The data line 6a is formed to partially cover the channel region 1a' of the TFT 30. In addition, the data line 6a and the heavily-doped source region 1d are connected to each other through the contact hole 81. Alternatively, as a modification of the present embodiment, before the data line 6a is formed, another conductive film having lower reflectivity than a conductive film, such as an aluminum film forming a main body of the data line 6a, may be formed on a surface of the data line 6a facing the channel region 1a'. The pixel-potential-side electrode 300 and the heavily-doped drain region 1e are connected to each other through the contact hole 83. Then, the dielectric film 75 is stacked in a predetermined pattern on the pixel-potential-side electrode 300. Then, a precursory film 42a of the second interlayer insulating film 42 is formed over the entire surface of the TFT array substrate 10. On a surface of the precursory film 42a, unevenness caused by the TFT 30, the data line 6a, the pixel-potential-side electrode 300, the contact holes 81 and 83 located therebelow is generated. For this reason, the precursory film 42a is formed to be thick, and then the precursory film 42a is cut out to a dotted line in the drawing by using the CMP process, for example, so as to planarize the surface of the precursory film 42a, thereby forming the second interlayer insulating film 42.

Figure 11:
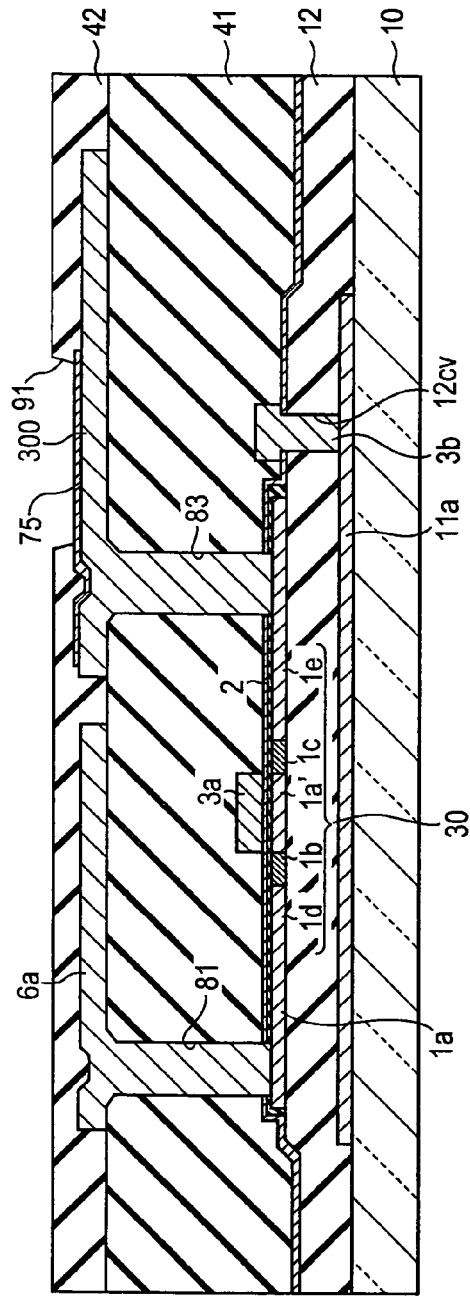
FIG. 11 is a cross-sectional view illustrating the method of manufacturing the liquid crystal device according to the first embodiment in the order (third process).

Thereafter, referring to the process shown in FIG. 11, a predetermined portion of the second interlayer insulating film 42 is etched to form the opening 91, thereby exposing the dielectric film 75. Here, the opening 91 can be formed in a predetermined region where the dielectric film 75 is exposed, within the non-opening region of a pixel.

Figure 12:
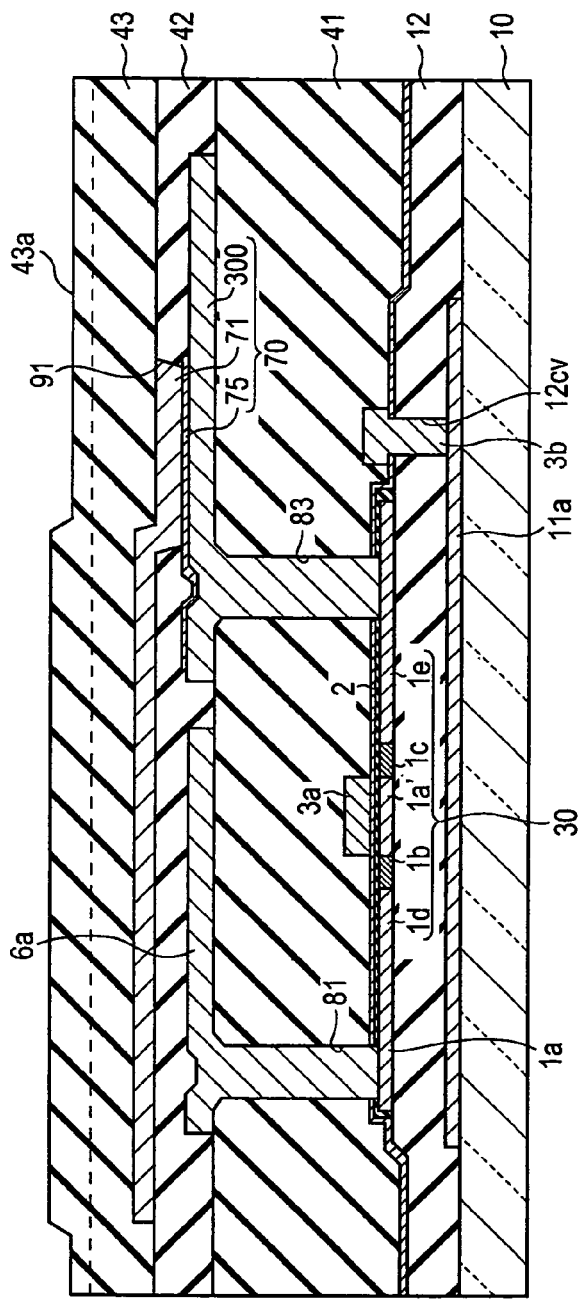
FIG. 12 is a cross-sectional view illustrating the method of manufacturing the liquid crystal device according to the first embodiment in the order (fourth process).

Subsequently, referring to the process shown in FIG. 12, a conductive light shielding film is stacked on a non-opening region of the TFT array substrate 10 and the fixed-potential-side electrode 71 is formed. At this time, the fixed-potential-side electrode 71 is stacked on the dielectric film 75 exposed through the opening 91, thereby forming the storage capacitor 70. In addition, the fixed-potential-side electrode 71 is provided to extend above the data line 6a through the second interlayer insulating film 42 interposed therebetween. Then, a precursory film 43a of the third interlayer insulating film 43 is formed over the entire surface of the TFT array substrate 10. On a surface of the precursory film 43a, unevenness caused by the fixed-potential-side electrode 71 or the like is generated. For this reason, the precursory film 43a is formed to be thick, and then the precursory film 43a is cut out to a dotted line in the drawing by using the CMP process, for example, so as to planarize the surface of the precursory film 43a, thereby forming the third interlayer insulating film 43.

Figure 13:
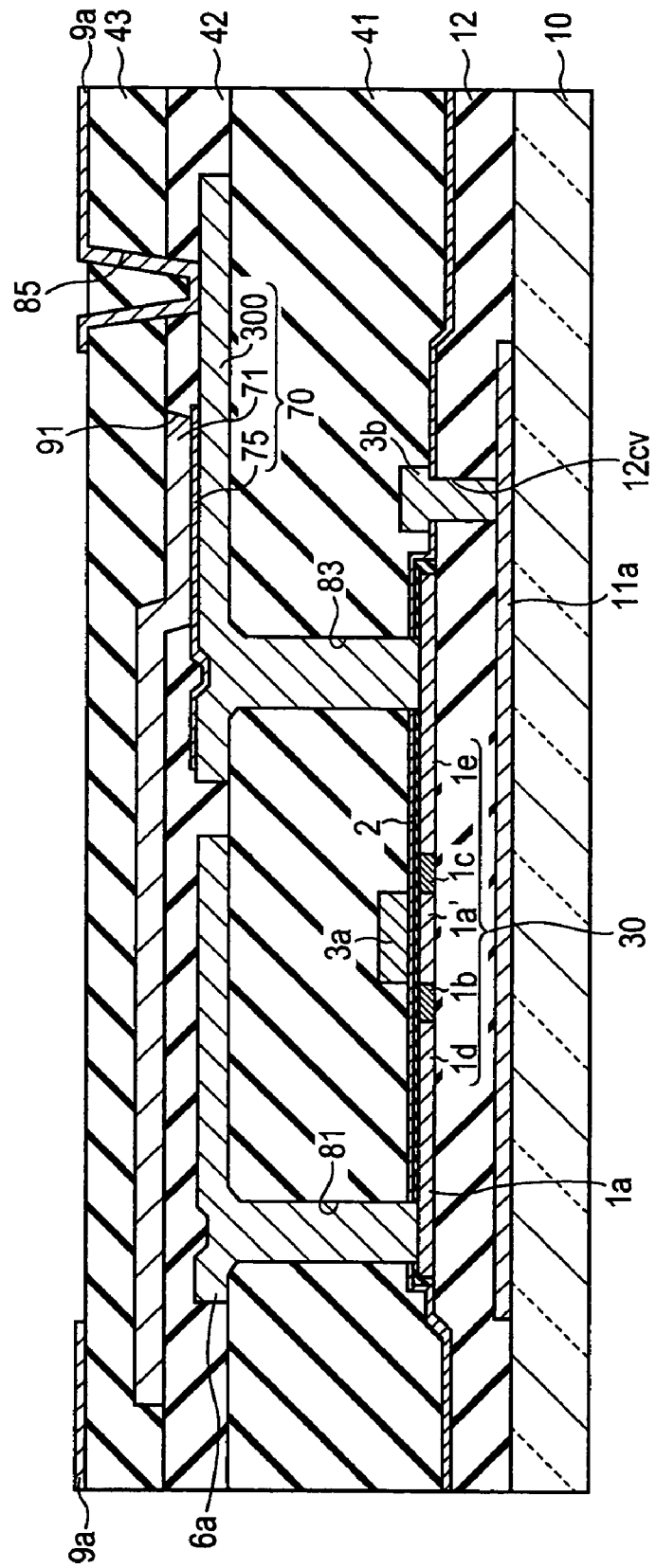
FIG. 13 is a cross-sectional view illustrating the method of manufacturing the liquid crystal device according to the first embodiment in the order (fifth process).

Thereafter, referring to the process shown in FIG. 13, a predetermined portion of the third interlayer insulating film 43 is etched to form the contact hole 85 which passes through the third interlayer insulating film 43 and the second interlayer insulating film 42 and has a depth reaching the extending portion of the pixel-potential-side electrode 300. Then, the pixel electrode 9a is formed at a predetermined location of a surface of the third interlayer insulating film 43. At this time, the pixel electrode 9a is also formed inside the contact hole 85. However, since the hole diameter of the contact hole 85 is large, the pixel electrode 9a is reliably formed.

According to the above-described method of manufacturing the liquid crystal device, the liquid crystal device of the present embodiment described above can be manufactured. Here, since the stacked structure on the TFT array substrate 10 is relatively simple, it is possible to simplify the manufacturing process and to improve the manufacturing yield.

Second Embodiment

Next, an electro-optical device according to a second embodiment will be described with reference to FIGS. 14 to 16.

The second embodiment is different from the first embodiment in the configuration of a storage capacitor. Therefore, it will be described about only a different point from the first embodiment.

First, a specific configuration of a pixel unit of a liquid crystal device according to the second embodiment will be described with reference to FIG. 14. Here, FIG. 14 is a cross-sectional view of the same object as FIG. 7, in the second embodiment. In addition, in FIG. 14, the same members as those in the first embodiment shown in FIG. 7 have the same reference numerals, and a detailed description thereof will be omitted.

Figure 14:
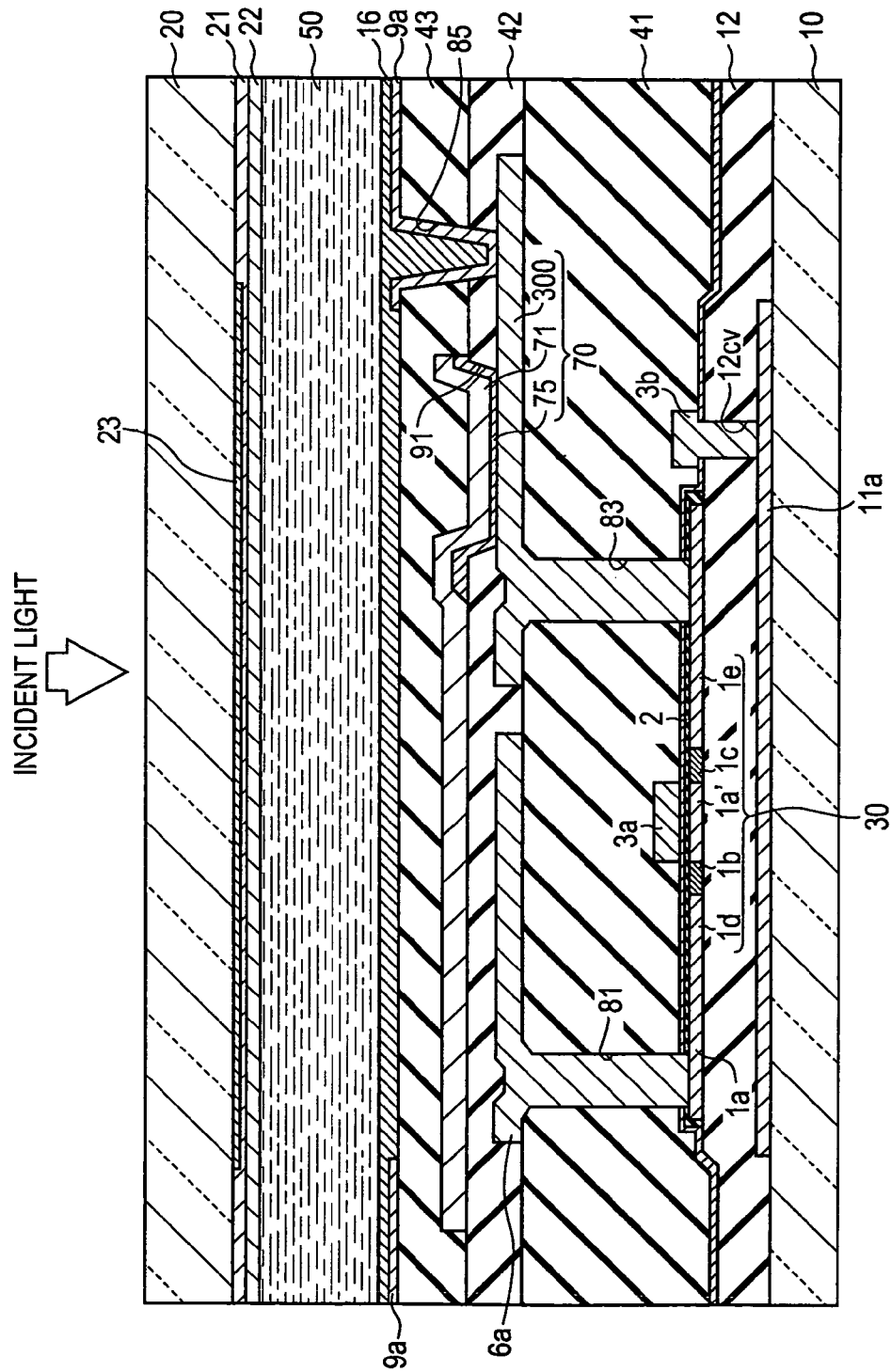
FIG. 14 is a cross-sectional view for the same object as FIG. 7, in a second embodiment.

As shown in FIG. 14, particularly in the second embodiment, the storage capacitor 70 is formed by stacking the pixel-potential-side electrode 300, the dielectric film 75, and the fixed-potential-side electrode 71 in this order from below, and the dielectric film 75 and the fixed-potential-side electrode 71 are stacked on the pixel-potential-side electrode 300 exposed through the opening 91 passing through the second interlayer insulating film 42. As such, by providing an opening in a predetermined region within a non-opening region of a pixel, it is possible to form a storage capacitor in the predetermined region.

As such, it is possible to simplify the stacked structure on the substrate and to perform high-quality image display. Further, the simplification of the stacked structure on the substrate causes the manufacturing process to be simplified and the manufacturing yield to be improved.

Method of Manufacturing Electro-Optical Device According to Second Embodiment

Next, a method of manufacturing the electro-optical device according to the second embodiment will be described with reference to FIGS. 15 and 16. FIGS. 15 and 16 are process views illustrating the stacked structure of the electro-optical device in a process of forming a storage capacitor of manufacturing processes, in the stacking order of the cross section corresponding to FIG. 14.

In the method of manufacturing the electro-optical device of the second embodiment, a method of manufacturing the storage capacitor is different from that in the first embodiment. Therefore, it will be described about only a different point from the method of manufacturing the electro-optical device of the first embodiment.

Figure 15:
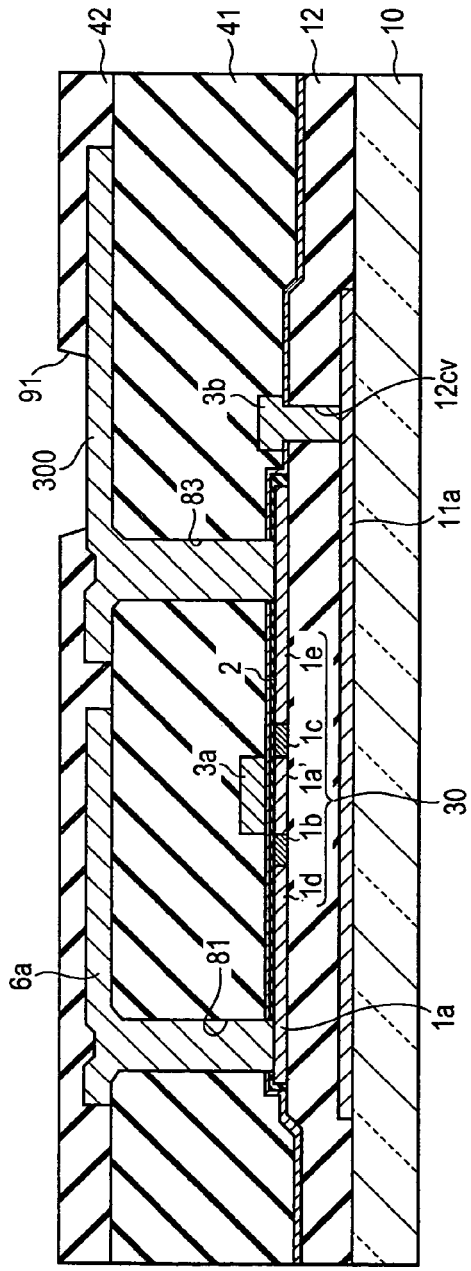
FIG. 15 is a cross-sectional view illustrating a method of manufacturing a liquid crystal device according to the second embodiment in the order (first process).

In the process shown in FIG. 15, a predetermined portion of the second interlayer insulating film 42 is etched to form the opening so that the pixel-potential-side electrode 300 is exposed. Here, the opening 91 can be formed in a predetermined region where the pixel-potential-side electrode 300 is exposed, within the non-opening region of a pixel.

Figure 16:
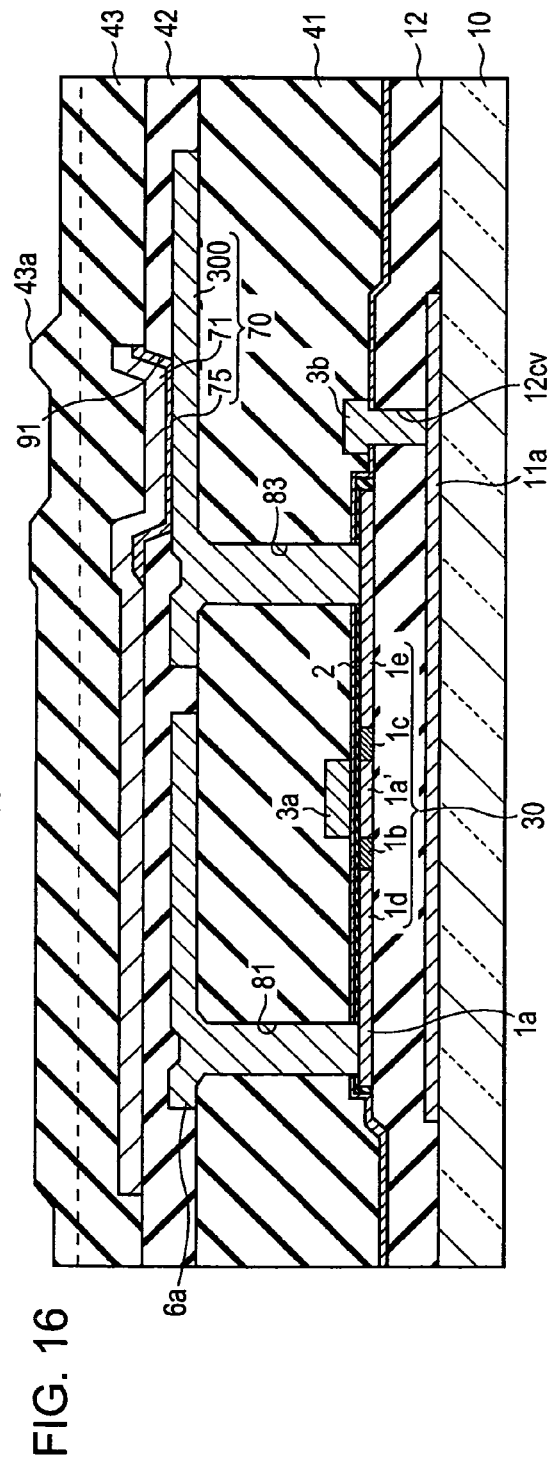
FIG. 16 is a cross-sectional view illustrating the method of manufacturing the liquid crystal device according to the second embodiment in the order (second process).

Then, in the process shown in FIG. 16, the dielectric film 75 is stacked on the pixel-potential-side electrode 300 exposed through the opening 91. Then, the conductive light shielding film is stacked on the non-opening region of the TFT array substrate 10 so as to form the fixed-potential-side electrode 71, thereby forming the storage capacitor 70. Further, the fixed-potential-side electrode 71 is provided to extend above the data line 6a through the second interlayer insulating film 42 interposed therebetween. Then, a precursory film 43a of the third interlayer insulating film 43 is formed over the entire surface of the TFT array substrate 10. On a surface of the precursory film 43a, unevenness caused by the fixed-potential-side electrode 71 or the like is generated. For this reason, the precursory film 43a is formed to be thick, and then the precursory film 43a is cut out to a dotted line in the drawing by using a CMP process, for example, so as to planarize the surface of the precursory film 43a, thereby forming the third interlayer insulating film 43.

Third Embodiment

Figure 17:
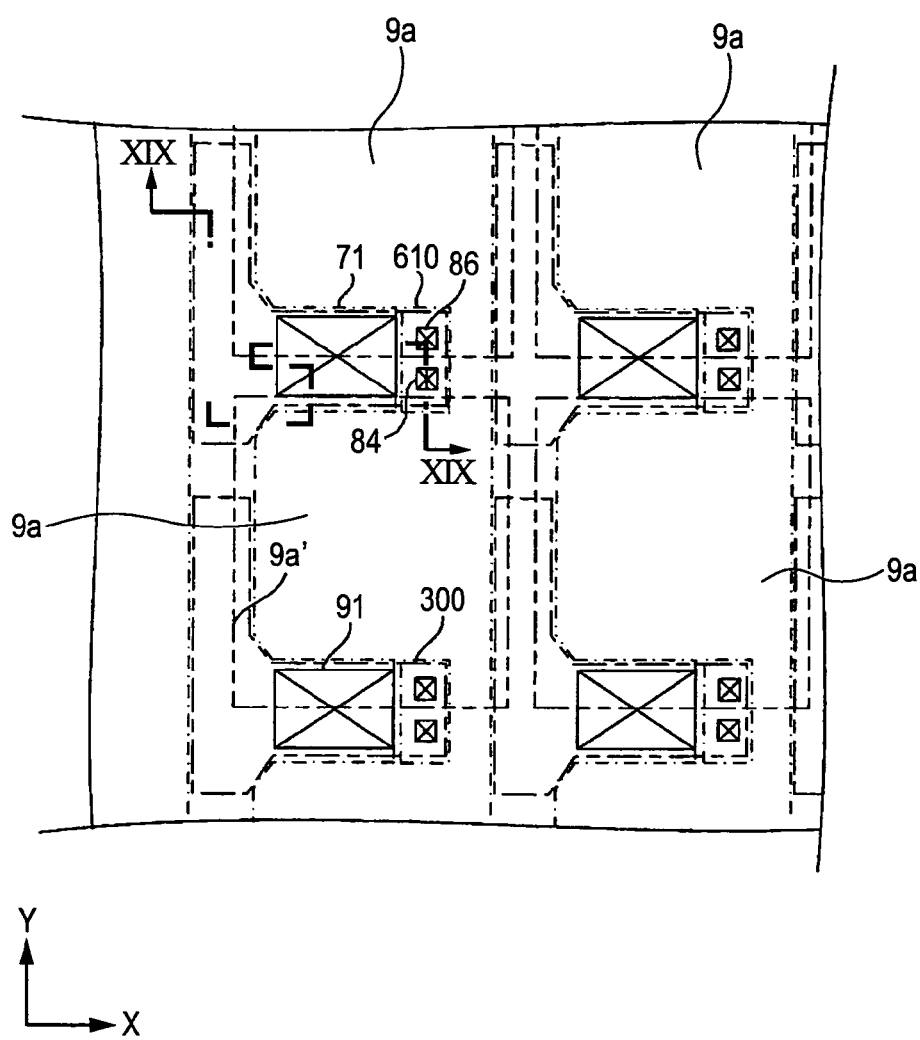
FIG. 17 is a cross-sectional view for the same object as FIG. 5, in a third embodiment.
Figure 18:
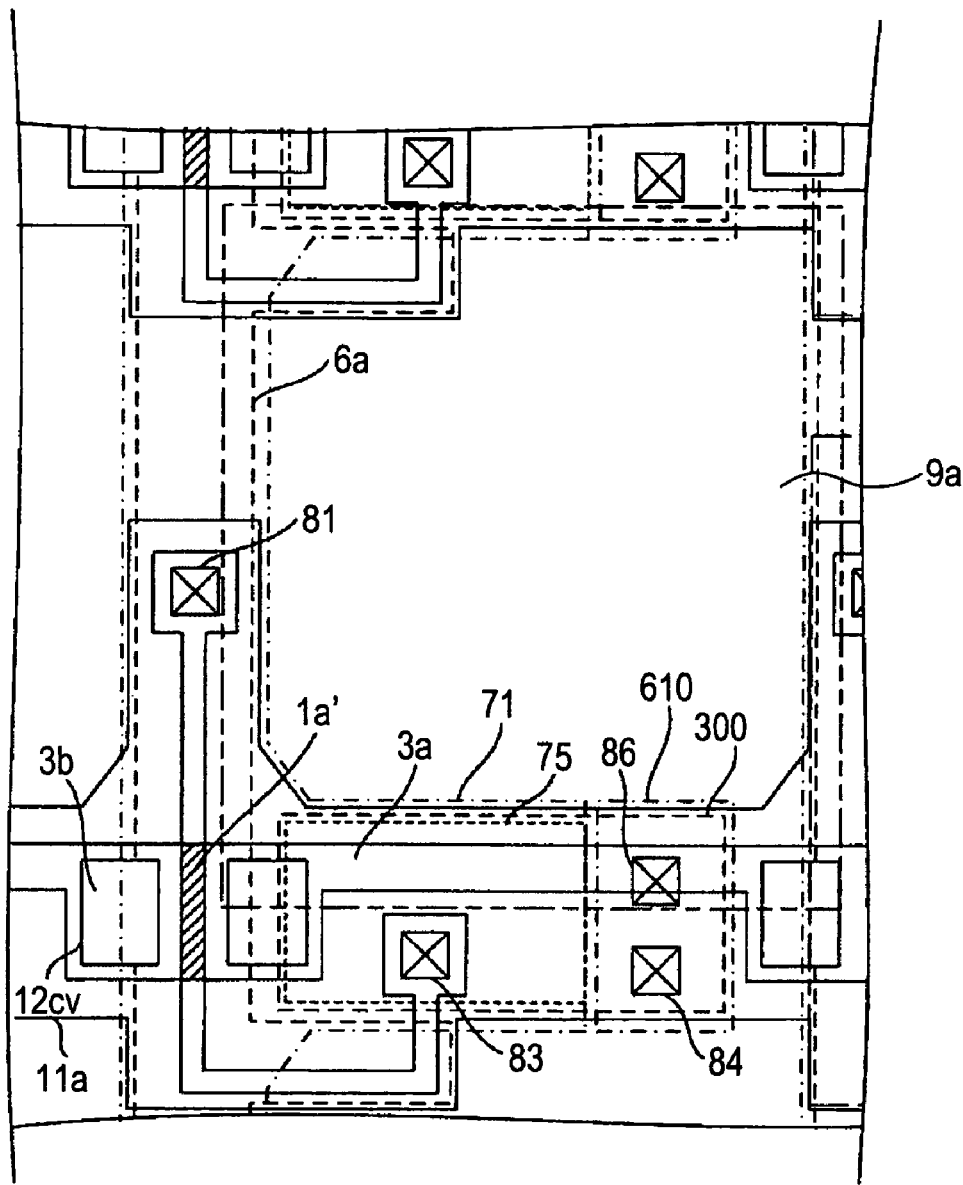
FIG. 18 is a cross-sectional view for the same object as FIG. 6, in the third embodiment.

Next, an electro-optical device according to a third embodiment will be described with reference to FIGS. 17 to 19.

The third embodiment is different from the first embodiment in that a relay layer is further provided. Accordingly, it will be described about only a different point from the first embodiment.

A specific configuration of a pixel unit of a liquid crystal device according to the third embodiment will be described with reference to FIGS. 17 to 19. Here, FIG. 17 is a plan view for the same object as FIG. 5, in the third embodiment. FIG. 18 is a plan view for the same object as FIG. 6, in the third embodiment, where FIGS. 4 and 17 overlap each other. FIG. 19 is a cross-sectional view for the same object as FIG. 7, in the third embodiment. Also, FIG. 19 is a cross-sectional view taken along the line XIX-XIX when FIGS. 4 and 17 overlap each other. In addition, in FIGS. 17 to 19, the same members as those in the first embodiment shown in FIGS. 4 to 7 have the same reference numerals, and a detailed description thereof will be omitted.

Figure 19:
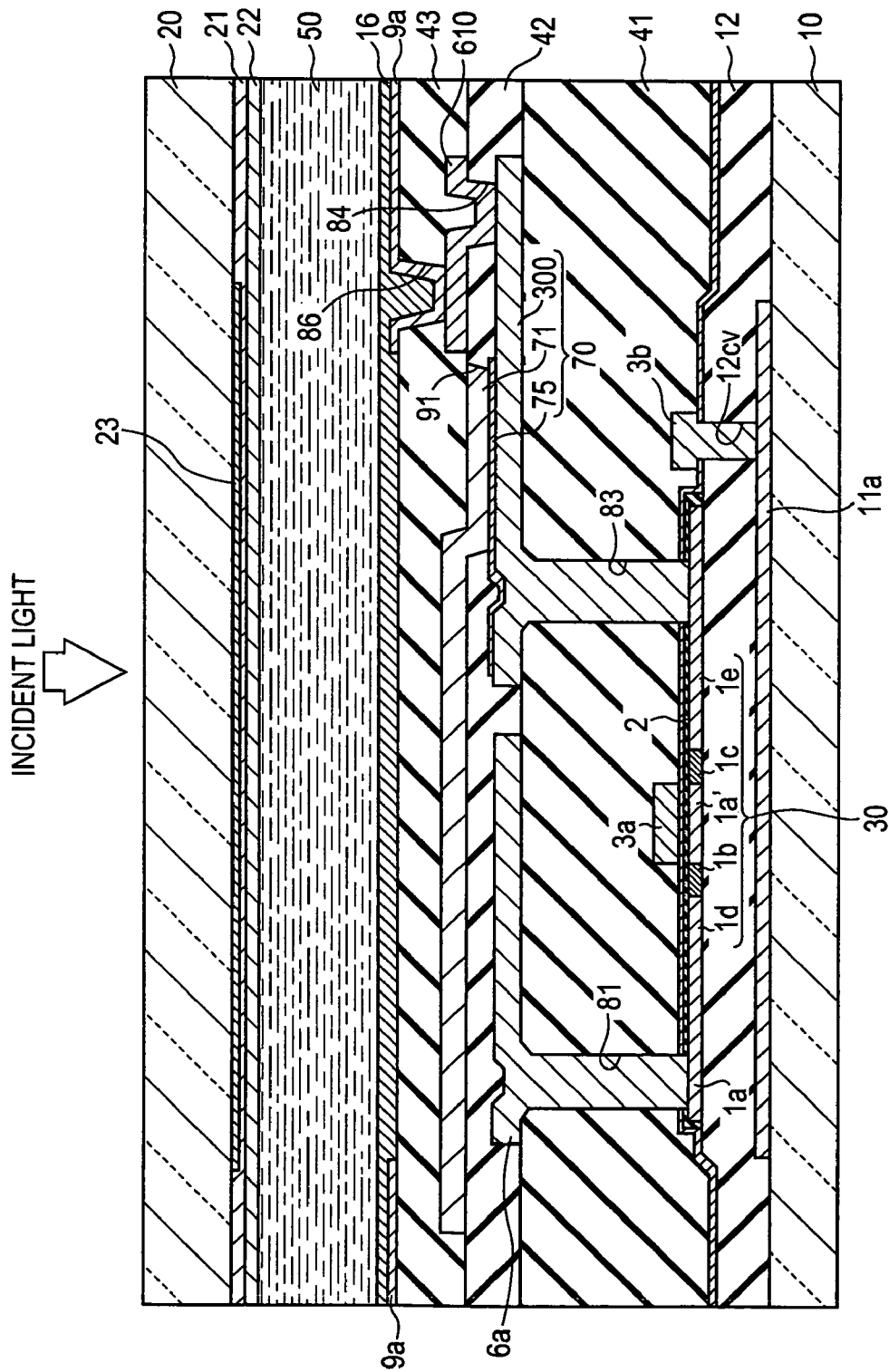
FIG. 19 is a cross-sectional view for the same object as FIG. 7, in the third embodiment.

As shown in FIG. 19, particularly in the third embodiment, a relay layer 610 is formed on the second interlayer insulating film 42 as the same film as the fixed-potential-side electrode 71. The relay layer 610 and the data line 6a are provided to be separated from each other, as shown in FIG. 17. Further, the relay layer 610 is electrically connected to the extending portion of the pixel-potential-side electrode 300 through a contact hole 84 passing through the second interlayer insulating film 42. Furthermore, the pixel electrode 9a is electrically connected to the relay layer 610 through a contact hole 86 passing through the third interlayer insulating film 43. That is, the pixel electrode 9a and the extending portion of the pixel-potential-side electrode 300 are relay-connected to each other through the relay layer 610. Thereby, it is possible to avoid difficulty in making a connection between the pixel electrode 9a and the pixel-potential-side electrode 300 with one contact hole because the interlayer distance therebetween is long. In addition, the stacked structure and the manufacturing process do not become complicated. Moreover, since the relay layer 610 is formed by the conductive light shielding film, which is the same film as the fixed-potential-side electrode 71, there is little possibility that the relay layer 610 will cause the light shielding performance to be deteriorated.

Further, the extending portion of pixel-potential-side electrode 300 is electrically connected to the heavily-doped drain region 1e of the TFT 30 through the contact hole 83. Accordingly, the relay layer 610 and the drain of the heavily-doped drain region 1e of the TFT 30 are electrically connected to each other through the extending portion of the pixel-potential-side electrode 300. Thereby, it is possible to avoid difficulty in making a connection between the pixel electrode 9a and the drain of the heavily-doped drain region 1e of the TFT 30 with one contact hole because the interlayer distance therebetween is long. In addition, the stacked structure and the manufacturing process do not become complicated.

Fourth Embodiment

Next, an electro-optical device according to a fourth embodiment will be described with reference to FIG. 20. Here, FIG. 20 is a cross-sectional view for the same object as FIG. 7, in the fourth embodiment.

The fourth embodiment is different from the first embodiment in that a storage capacitor is constructed in a different method and a relay layer is further provided. Accordingly, it will be described about only a different point from the first embodiment.

Figure 20:
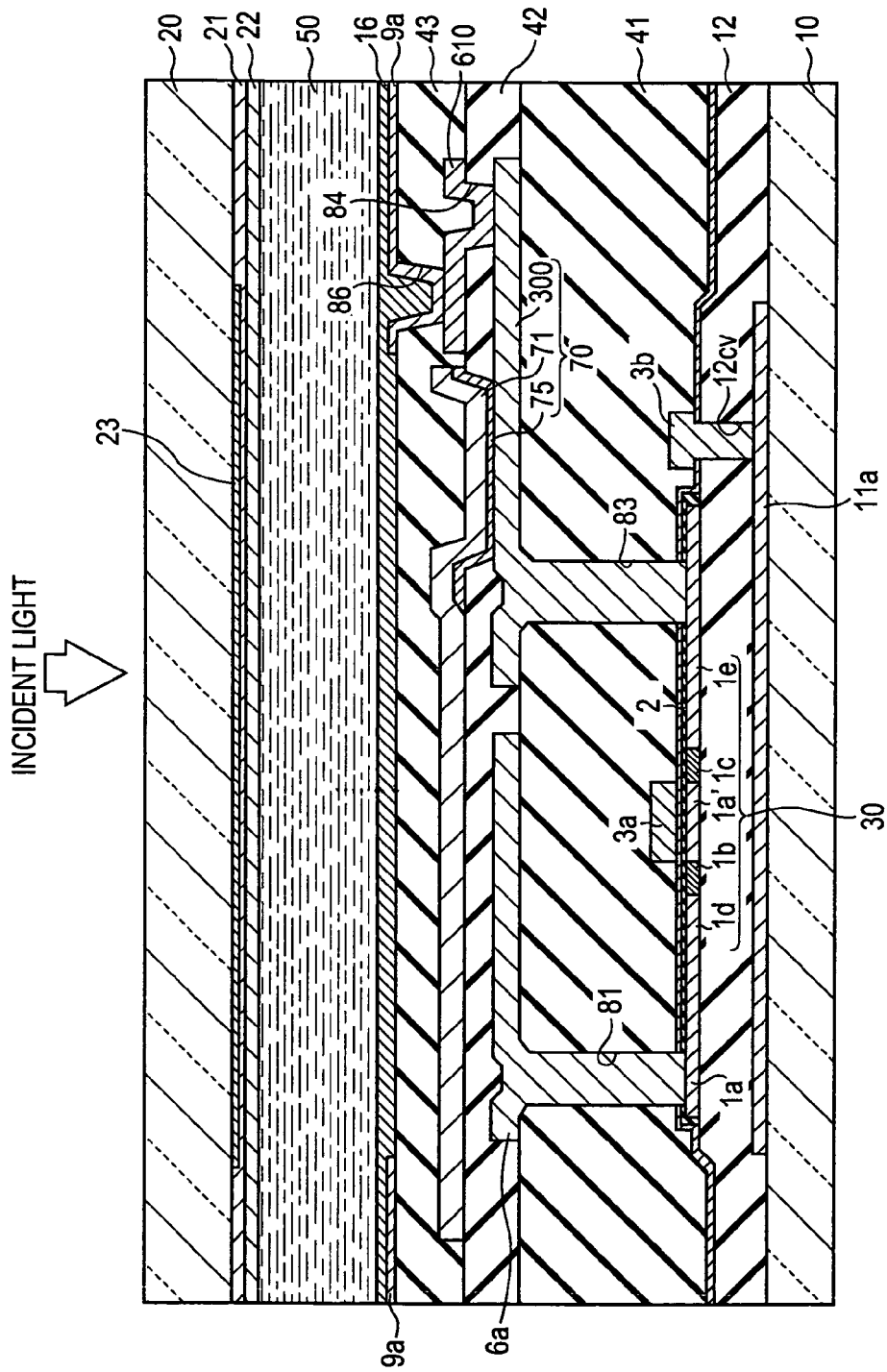
FIG. 20 is a cross-sectional view for the same object as FIG. 7, in a fourth embodiment.

As shown in FIG. 20, in the same manner as in the second embodiment, the storage capacitor 70 is formed by stacking the pixel-potential-side electrode 300, the dielectric film 75, and the fixed-potential-side electrode 71 in this order from below, and the dielectric film 75 and the fixed-potential-side electrode 71 are stacked on the pixel-potential-side electrode 300 exposed through the opening 91 passing through the second interlayer insulating film 42. Accordingly, in the same manner as in the second embodiment, it is possible to simplify the stacked structure on the substrate and to perform high-quality image display. In addition, the simplification of the stacked structure on the substrate causes the manufacturing process to be simplified and the manufacturing yield to be improved.

Further, the relay layer 610 is formed on the second interlayer insulating film 42 as the same film as the fixed-potential-side electrode 71, in the same manner as in the third embodiment. For this reason, in the same manner as in the third embodiment, it is possible to avoid difficulty in making a connection between the pixel electrode 9a and the pixel-potential-side electrode 300 or between the pixel electrode 9a and the heavily-doped drain region 1e of the TFT 30 with one contact hole because the interlayer distance therebetween is long. In addition, the stacked structure and the manufacturing process do not become complicated.

Electronic Apparatus

Next, cases in which the liquid crystal device, which is the above-described electro-optical device, is applied to various electronic apparatuses will be described.

Figure 21:
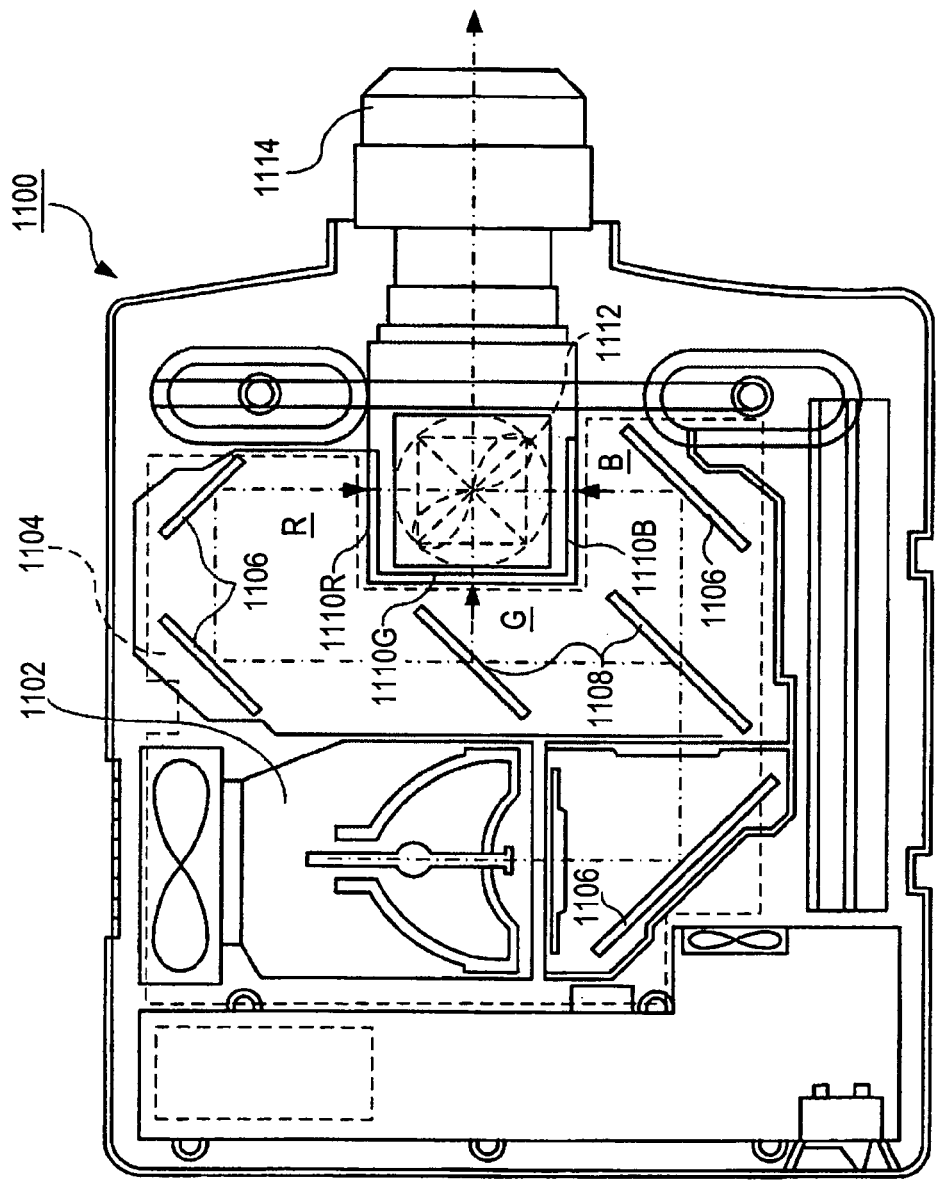
FIG. 21 is a plan view illustrating the configuration of a projector, which is an example of an electronic apparatus, to which an electro-optical device is applied.

First, a projector which uses the liquid crystal device as a light valve will be described. FIG. 21 is a plan view illustrating an example of a configuration of the projector. As shown in FIG. 21, a projector 1100 includes a lamp unit 1102 composed of a white light source, such as a halogen lamp. Projection light emitted from the lamp unit 1102 is separated into light components having three primary colors of R (red), G (green), and B (blue) by four sheets of mirrors 1106 and two sheets of dichroic mirrors 1108, and then the light components having the three primary colors are respectively incident on liquid crystal panels 1110R, 1110B, and 1110G, serving as light valves, corresponding to the respective primary colors.

The configurations of the liquid crystal panels 1110R, 1110G, and 1110B are the same as that of the above-described liquid crystal device, and the liquid crystal panels 1110R, 1110B, and 1110G are respectively driven by R, G, and B primary color signals supplied from an image signal processing circuit. The light components modulated by the liquid crystal panels 1110R, 1110B, and 1110G are incident on a dichroic prism 1112 from the three directions. The dichroic prism 1112 causes the light components having the R and B colors to be refracted by 90° and the light component having the G color to go straight. Then, images, each having one of the light components for three primary colors, are synthesized, such that a color image is projected onto a screen or the like through a projection lens 1114.

Here, in display images formed on the respective liquid crystal panels 1110R, 1110B, and 1110G, it is necessary that the display image formed on the liquid crystal panel 1110G be left and right inverted with respect to the display image formed on the liquid crystal panels 1110R and 1110B.

Further, since the light components corresponding to the primary colors of R, G, and B are respectively incident on the liquid crystal panels 1110R, 1110B, and 1110G by the dichroic mirrors 1108, it is not necessary to prepare a color filter.

Figure 22:
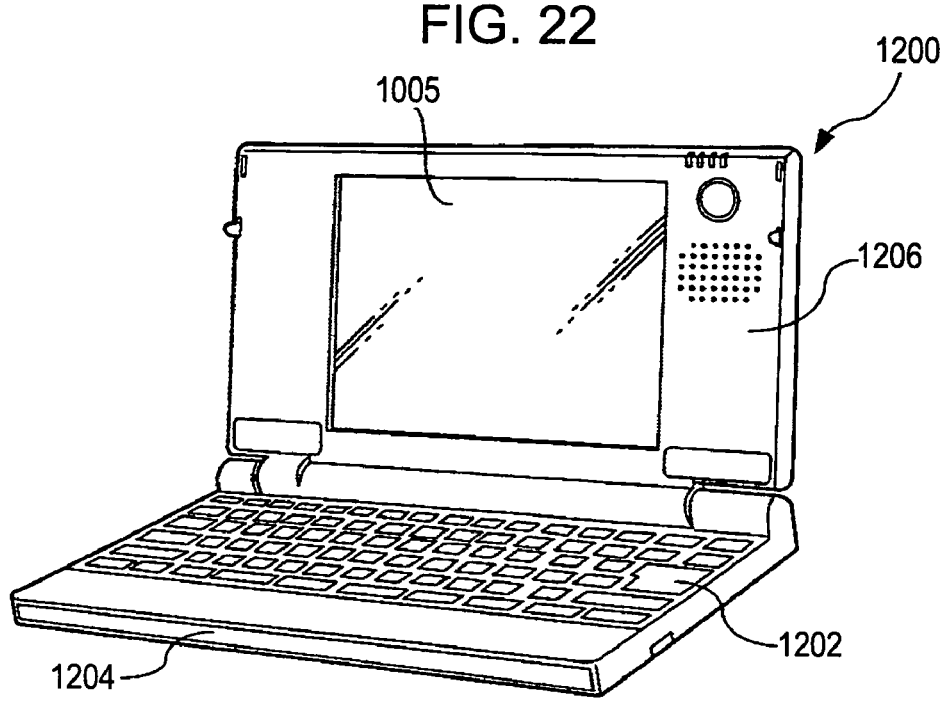
FIG. 22 is a plan view illustrating the configuration of a personal computer, which is an example of an electronic apparatus, to which the electro-optical device is applied.

Next, a case in which the liquid crystal device is applied to a mobile personal computer will be described. FIG. 22 is a perspective view illustrating the configuration of the personal computer. Referring to FIG. 22, a computer 1200 includes a main body unit 1204 having a keyboard 1202, and a liquid crystal display unit 1206. The liquid crystal display unit 1206 is provided with a backlight on a rear surface of a liquid crystal device 1005 described above.

Figure 23:
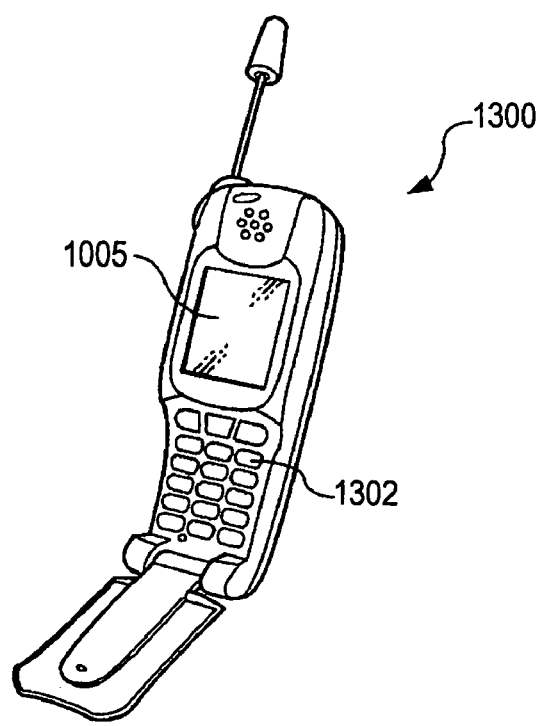
FIG. 23 is a plan view illustrating the configuration of a mobile phone, which is an example of an electronic apparatus, to which an electro-optical device is applied.

Further, a case in which the liquid crystal device is applied to a mobile phone will be described. FIG. 23 is a perspective view illustrating the configuration of the mobile phone. Referring to FIG. 23, a mobile phone 1300 includes a plurality of operation buttons 1302 and a reflective liquid crystal device 1005. The reflective liquid crystal device 1005 may be provided with a frontlight on a front surface thereof according to the necessity.

Furthermore, the electro-optical device can be applied to various electronic apparatuses, such as a liquid crystal television, a viewfinder-type or monitor-direct-view-type video tape recorder, a car navigation device, a pager, an electronic organizer, an electronic calculator, a word processor, a workstation, a video phone, a POS terminal, a device having a touch panel, and the like, in addition to the electronic apparatuses described above with reference to FIGS. 21 to 23.

Furthermore, the invention can be implemented as an LCOS (liquid crystal on silicon) device in which elements are formed on a silicon substrate, a plasma display panel (PDP), field emission type display devices (FED, SED), an organic EL display device, and the like, in addition to the liquid crystal device described in the above embodiments.

It should be understood that the invention is not limited to the above-described embodiments, but various modifications can be made within the scope without departing from the subject matter or spirit of the invention defined by the appended claims and the entire specification. Therefore, an electro-optical device, an electronic apparatus having the electro-optical device, and a method of manufacturing the electro-optical device that accompany such modifications still fall within the technical scope of the invention.

What is claimed is:

1. An electro-optical device, comprising:
a substrate;
data lines and scanning lines above the substrate, the data and scanning lines intersecting each other in plan view to form intersections;
thin film transistors disposed corresponding to the intersections of the data and scanning lines, the thin film transistors being above the substrate and below the data lines, each of the thin film transistors including a channel region that is at least partially covered by each of the data lines in plan view above the substrate, and each of the scanning lines being disposed in a region including a region facing the channel region in plan view above the substrate, being disposed below each of the thin film transistors on the substrate, being connected to a gate of each of the thin film transistors through a contact hole, and including a third conductive light shielding film;
storage capacitors disposed above the data lines, each of the storage capacitors including a pixel-potential-side electrode, a dielectric film, and a fixed-potential-side electrode that are stacked with respect to each other, such that the pixel-potential-side electrode is below the dielectric film and the dielectric film is below the fixed-potential-side electrode, each of the storage capacitors being disposed in a region including a region facing the channel region in plan view above the substrate, and each of the data lines including a first conductive light shielding film, and at least one of the fixed-potential-side electrode and the pixel-potential-side electrode including a second conductive light shielding film;
pixel electrodes disposed for respective pixels defined in correspondence with the data lines and the scanning lines in plan view above the substrate, each of the pixel electrodes being electrically connected to the pixel-potential-side electrode and each of the thin film transistors; and
an interlayer insulating film stacked above at least a portion of the dielectric film, the interlayer insulating film defining an opening, the fixed-potential-side electrode of one of the storage capacitors being disposed on the respective dielectric film at the opening.

2. The electro-optical device according to claim 1,
the dielectric film being formed in non-opening regions located between opening regions of the respective pixels in plan view above the substrate.

3. The electro-optical device according to claim 1,
further including a conductive film formed on a surface of each of the data lines facing the channel region, the conductive film having lower reflectivity than a conductive film forming a main body of each of the data lines.

4. The electro-optical device according to claim 1,
the pixel-potential-side electrode being formed by using a conductive film located at the same layer as the data lines.

5. The electro-optical device according to claim 1, further comprising:
a relay layer formed on the substrate by using a conductive film located at the same layer as the fixed-potential-side electrode, and that relay-connects the pixel-potential-side electrode and each of the pixel electrodes.

6. The electro-optical device according to claim 5,
the relay layer being electrically connected to a drain of each of the thin film transistors through an extending portion of the pixel-potential-side electrode.

7. An electronic apparatus, comprising: the electro-optical device according to claim 1.

* * * * *